(12) United States Patent
Geyer et al.

(10) Patent No.: US 6,769,396 B2
(45) Date of Patent: Aug. 3, 2004

(54) DIAPHRAGM CARBURETOR

(75) Inventors: Werner Geyer, Berglen (DE); Claus Fleig, Ludwigsburg (DE); Jörg Schlossarczyk, Winnenden (DE); Bernd Knödler, Winnenden (DE)

(73) Assignee: Andreas Stihl AG & Co. KG (DE)

( * ) Notice: Subject to any disclaimer, the term of this patent is extended or adjusted under 35 U.S.C. 154(b) by 0 days.

(21) Appl. No.: 10/422,048

(22) Filed: Apr. 23, 2003

(65) Prior Publication Data

US 2003/0213464 A1 Nov. 20, 2003

(30) Foreign Application Priority Data

May 15, 2002 (DE) .......................................... 102 21 446
Oct. 25, 2002 (DE) .......................................... 102 49 717

(51) Int. Cl.[7] ................................................ F02D 1/00
(52) U.S. Cl. ........................ 123/336; 123/442; 123/586
(58) Field of Search ................................ 123/336, 442, 123/586, 337, 437, 585, 583

(56) References Cited

U.S. PATENT DOCUMENTS

| | | | | |
|---|---|---|---|---|
| 4,254,745 A | * | 3/1981 | Noguchi et al. | 123/51 B |
| 4,294,205 A | * | 10/1981 | Iiyama et al. | 123/274 |
| 4,452,218 A | * | 6/1984 | Yokoyama et al. | 123/579 |
| 4,484,551 A | * | 11/1984 | Choma et al. | 123/336 |
| 4,567,860 A | * | 2/1986 | Sugiyama | 123/184.42 |
| 5,299,548 A | * | 4/1994 | Beall | 123/586 |
| 6,328,288 B1 | | 12/2001 | Gerhardy | |

FOREIGN PATENT DOCUMENTS

DE          199 18 719          10/2000

* cited by examiner

Primary Examiner—John Kwon
(74) Attorney, Agent, or Firm—R W Becker & Associates; R W Becker

(57) ABSTRACT

A diaphragm carburetor for an internal combustion engine that operates with scavenging is provided, especially for the two-cycle engine in a manually guided implement. The carburetor has a housing in which is formed an intake channel portion in which is disposed a butterfly valve that is rotatably held via a butterfly valve shaft. The carburetor has at least one air channel that supplies additional combustion air and that is provided with an air valve that is rotatably held via an air valve shaft. The air valve is, at least in one angular range, coupled to the movement of the butterfly valve, whereby the coupling includes a butterfly valve lever that is fixedly connected with the butterfly valve shaft, and an air valve lever that is fixedly connected with the air valve shaft. Disposed on one of the levers is a driver member that at least in one angular range slides upon the other lever between an outer contact point and an inner contact point.

19 Claims, 18 Drawing Sheets

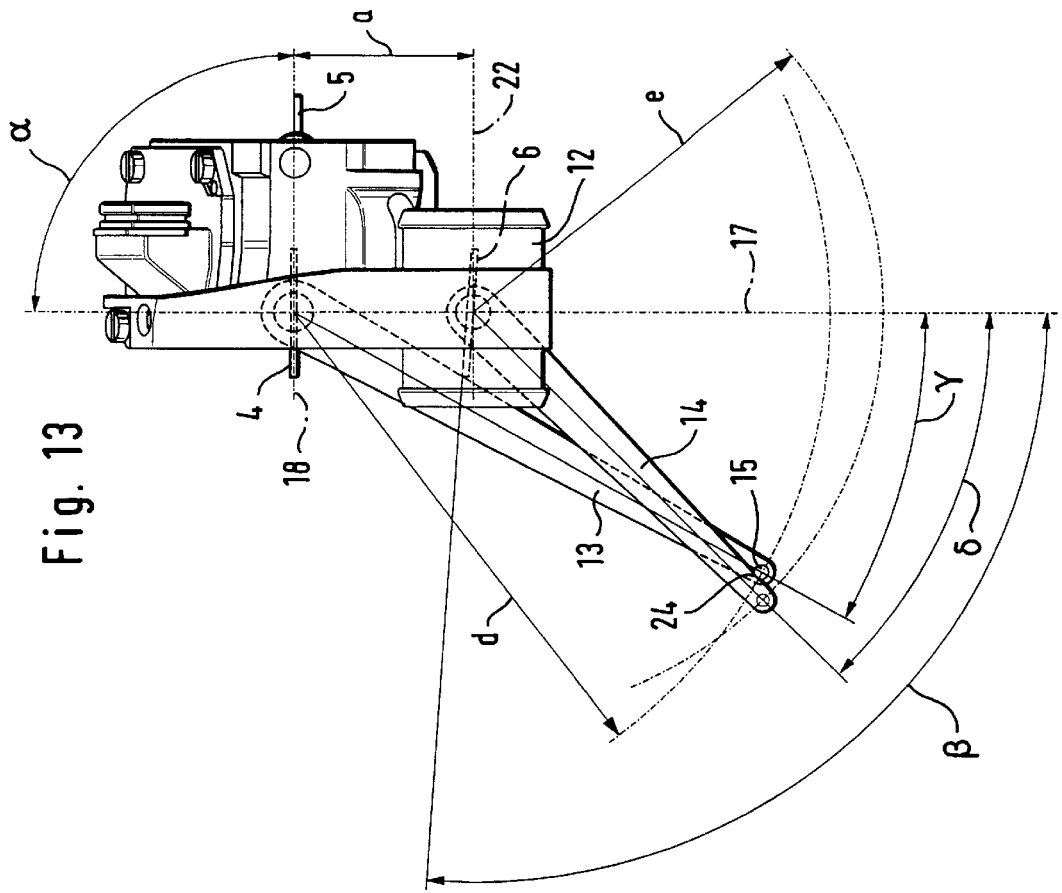
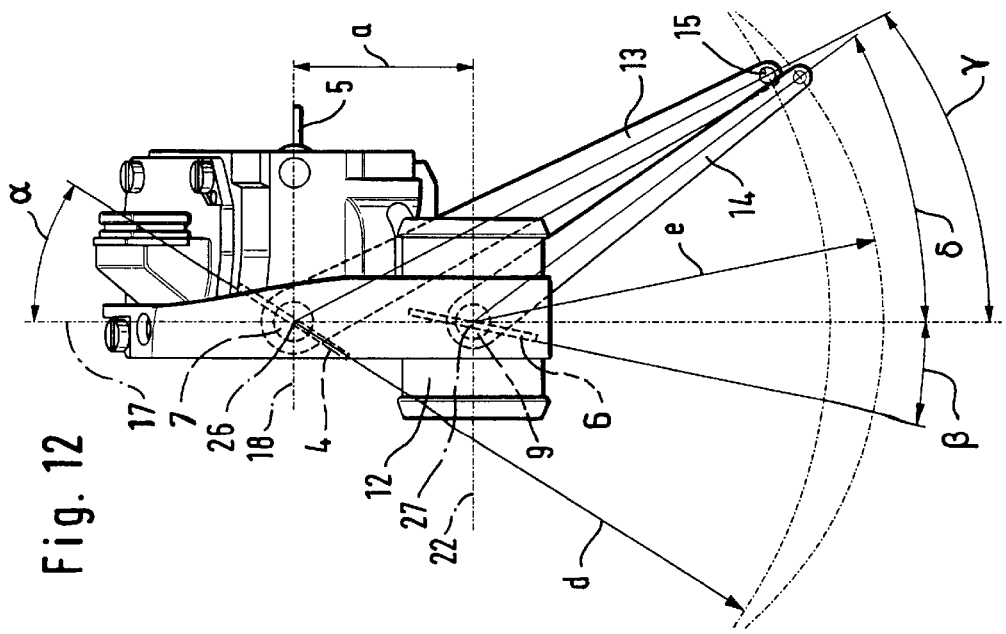

US 6,769,396 B2

DIAPHRAGM CARBURETOR

BACKGROUND OF THE INVENTION

The present invention relates to a diaphragm carburetor for an internal combustion engine that operates with scavenging, especially for the two-cycle engine in a manually-guided implement, such as a power chainsaw, a cut-off machine, a trimmer, a brush cutter, or the like.

DE 199 18 719 A1 discloses a diaphragm carburetor, the butterfly valve of which is coupled with the air valve. The butterfly valve can execute an idle path relative to the air valve. The butterfly valve and the air valve can be coupled via a linkage. With this type of coupling, the butterfly valve and the air valve open linearly after passing through the idle path. Another embodiment provides that the butterfly valve and air valve be coupled via levers that have a cam contour. By means of the cam contour, a desired opening characteristic of the air valve is to be achieved as a function of the position of the butterfly valve. However, the manufacture of such a cam contour is complicated. Already slight deviations from the desired dimensions of the cam contour lead to relatively large variations of the opening characteristic.

It is therefore an object of the present invention to provide a diaphragm carburetor of the aforementioned general type that imparts to the internal combustion engine a favorable ratio of the fuel/air mixture to clean air, and that is easy to manufacture.

BRIEF DESCRIPTION OF THE DRAWINGS

This object, and other objects and advantages of the present invention, will appear more clearly from the following specification in conjunction with the accompanying schematic drawings, in which:

FIG. 12 is a side view of a diaphragm carburetor, having an air channel, in the throttle gas position for starting;

FIG. 13 is a side view of the diaphragm carburetor of FIG. 12 in the full throttle position;

SUMMARY OF THE INVENTION

Figure 1:
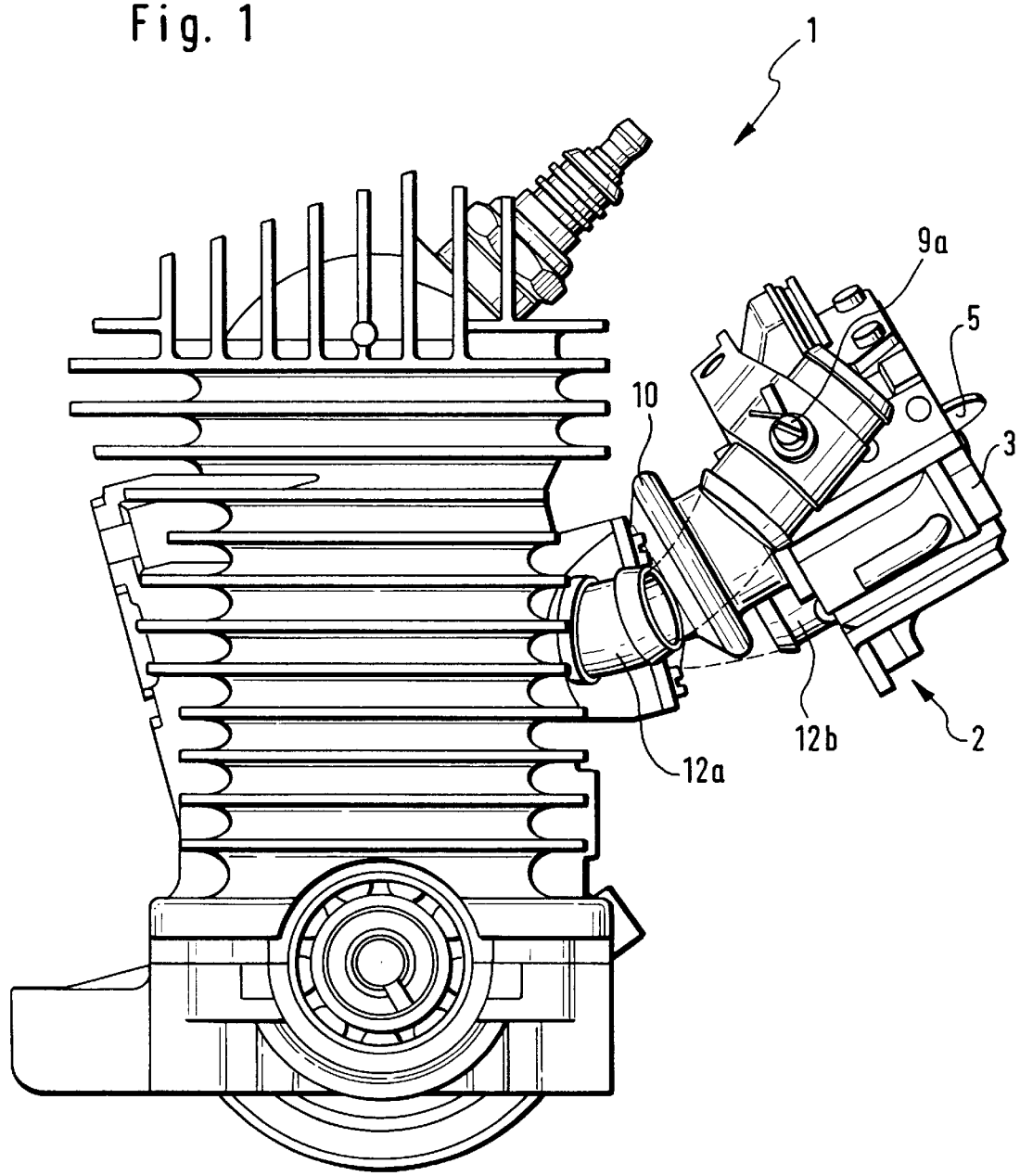
FIG. 1 is a side view of a two-cycle engine having a diaphragm carburetor.

Pursuant to the present invention, the diaphragm carburetor has a carburetor housing in which is formed an intake channel portion in which is disposed a butterfly valve that is rotatably held via a butterfly valve shaft, and in the region of which fuel supplying channels open into the intake channel portion. The carburetor is also provided with at least one air channel that supplies additional combustion air and that has an air valve that is rotatably held via an air valve shaft; the butterfly valve and the air valve are movable, in a closing direction, from an open position into a closed position, and in an opening direction, from the closed position into the opened position, whereby the air valve is mechanically coupled over an angular range with the movement of the butterfly valve, and the mechanical coupling includes a butterfly valve lever that is fixedly connected with the butterfly valve shaft, and an air valve lever that is fixedly connected with the air valve shaft; disposed on one of the levers is a driver member that at least in one angular range slides on the other lever between an outer contact point and an inner contact point.

The coupling of the butterfly valve and the air valve via a butterfly valve lever and an air valve lever can be realized in a straightforward manner. The driver member, which is disposed on one of the levers, can, for example, be embodied as a pin. Since the driver member is fixed on one of the levers and slides on the other lever, it is possible to realize a non-linear coupling of the butterfly valve and the air valve. For this purpose, it is not necessary to provide complicated and tolerance-sensitive cam contours. The levers have, in particular, a nearly rod-shaped configuration. The driver member is advantageously rotatably mounted on the lever. In this way, low wear between the lever and the driver member can be achieved.

It can be expedient for the axis of the butterfly valve shaft and the axis of the air valve shaft to be spaced from one another in the region of the coupling. This spacing amounts, in particular, to 2 to 150 mm. The spacing of the shafts ensures that the driver member slides on the other shaft. By means of the length of the levers and the position of the contact point of the two levers, the slide path between the outer and the inner contact points, and hence the magnitude of the non-linearity of the coupling, can be set. The butterfly valve shaft and the air valve shaft expediently extend parallel to one another. However, it can be advantageous for the butterfly valve shaft and the air valve shaft to extend in a skewed manner relative to one another. The air valve shaft and the butterfly valve shaft can also be disposed at an angle relative to one another. The arrangement of the shafts relative to one another is also a function of the installation conditions. It is advantageous to have a favorable, unthrottled flow path.

The opening direction of the butterfly valve and the air valve expediently extends in opposite directions of rotation. In this case, the length of the butterfly valve lever and/or of the air valve lever from the axis of the butterfly valve shaft or the axis of the air valve shaft, up to the outer contact point, is preferably 0.1 to 0.9 times the spacing between the axes of the butterfly valve shaft and the air valve shaft. It can also be expedient for the opening direction of the butterfly valve and the air valve to extend in the same direction of rotation. In this case, it is provided that the length of the butterfly valve lever and/or the air valve lever from the axis of the butterfly valve shaft or the axis of the air valve shaft, up to the outer contact point, be 1.1 to 15 times the spacing between the axes of the butterfly valve shaft and the air valve shaft. Large lever lengths lead to a tolerance-insensitive construction. As a result, manufacturing and assembly errors can be compensated for. By means of the ratio of the lever lengths to one another, and the position of the contact point of the two levers, the opening characteristic of the air valve can be set as a function of the position of the butterfly valve.

It is provided that the air valve shaft be spring loaded in a closing direction. This ensures that the air valve reliably follows the movement of the butterfly valve. For a good closing of the air valve, the latter expediently forms, in the closed position, an air valve angle β of 7 to 20° with the perpendicular line to the longitudinal axis of the air channel. For the butterfly valve, in the closed position a butterfly valve angle α with the perpendicular to the longitudinal axis of the intake channel of 10 to 20°, in particular 15°, is provided. With a butterfly valve angle of 15°, good closing characteristics of the butterfly valve result. In the closed position, the butterfly valve angle advantageously corresponds approximately to the air valve angle. For a good starting and acceleration characteristic of the engine, it is provided that the butterfly valve be rotatable about an angular difference of about 10 to 30° in the opening direction independently of the air valve. In this way, an adequate fuel supply to the engine is guaranteed in the lower speed range. Due to the non-linear course of the opening angle, in the lower speed range lower quantities of additional combustion air can be supplied, and in the upper speed range greater quantities of additional combustion air can be supplied for achieving low exhaust gas values. As the butterfly valve angle increases, the air valve angle advantageously increases in a constant gradient. This leads to a uniform running characteristic of the engine over the entire speed range.

One lever expediently has an angled-off configuration. In this way, the installation space that is required can be reduced. Furthermore, it is hereby easy to adapt to a prescribed installation space. In particular, that portion of the lever is angled off that includes the outer and inner contact points.

Further specific features of the present invention will be described in detail subsequently.

DESCRIPTION OF PREFERRED EMBODIMENTS

Referring now to the drawings in detail, a fuel/air mixture is supplied to the internal combustion engine 1 illustrated in FIG. 1 via the intake channel 10, and fresh air is supplied to the internal combustion engine via air channels 12a and 12b that are disposed on both sides of the intake channel 10. To reduce the exhaust gases, the internal combustion engine 1, which is embodied as a two-cycle engine, operates with scavenging. The fuel/air mixture from the intake channel 10 is supplied to the crankcase of the internal combustion engine 1, where it is compressed by a piston that reciprocates in the cylinder. In specific positions of the piston, the crankcase is fluidically connected via transfer channels with a combustion chamber that is formed in the cylinder of the internal combustion engine 1. In the upward stroke of the piston in the direction toward the combustion chamber, fuel/air mixture is drawn into the crankcase from the intake channel 10. The air channels 12a and 12b are connected with the transfer channels, for example via a piston window, and fill the transfer channels completely with fresh air.

During the downward stroke of the piston in the direction toward the crankcase, the fuel/air mixture is compressed. In a specific position of the piston, the transfer channels open to the combustion chamber and the fuel/air mixture from the crankcase flows into the combustion chamber. At the same time, the exhaust gas flows out of the combustion chamber. The exhaust gas is separated from the subsequently flowing fuel/air mixture by means of the air previously stored in the transfer channels, thus preventing an escape of the fresh fuel/air mixture from the combustion chamber. For a good scavenging result, the quantity of fuel/air mixture in the crankcase must be adapted to the quantity of air previously stored in the transfer channels. This is achieved by appropriate coordination of channel length, channel cross-section, and control times. In order to be able to also operate the engine in the partial load range, as well as in the transition phases of acceleration and deceleration, the supply of air and the supply of mixture must be capable of being throttled. For this purpose, air valves or chokes are provided for the air channels 12a and 12b, and a butterfly valve 4 is provided in the carburetor. The choke valve 5 is rotatably mounted in the carburetor housing 3 upstream of the butterfly valve 4.

Figure 2:
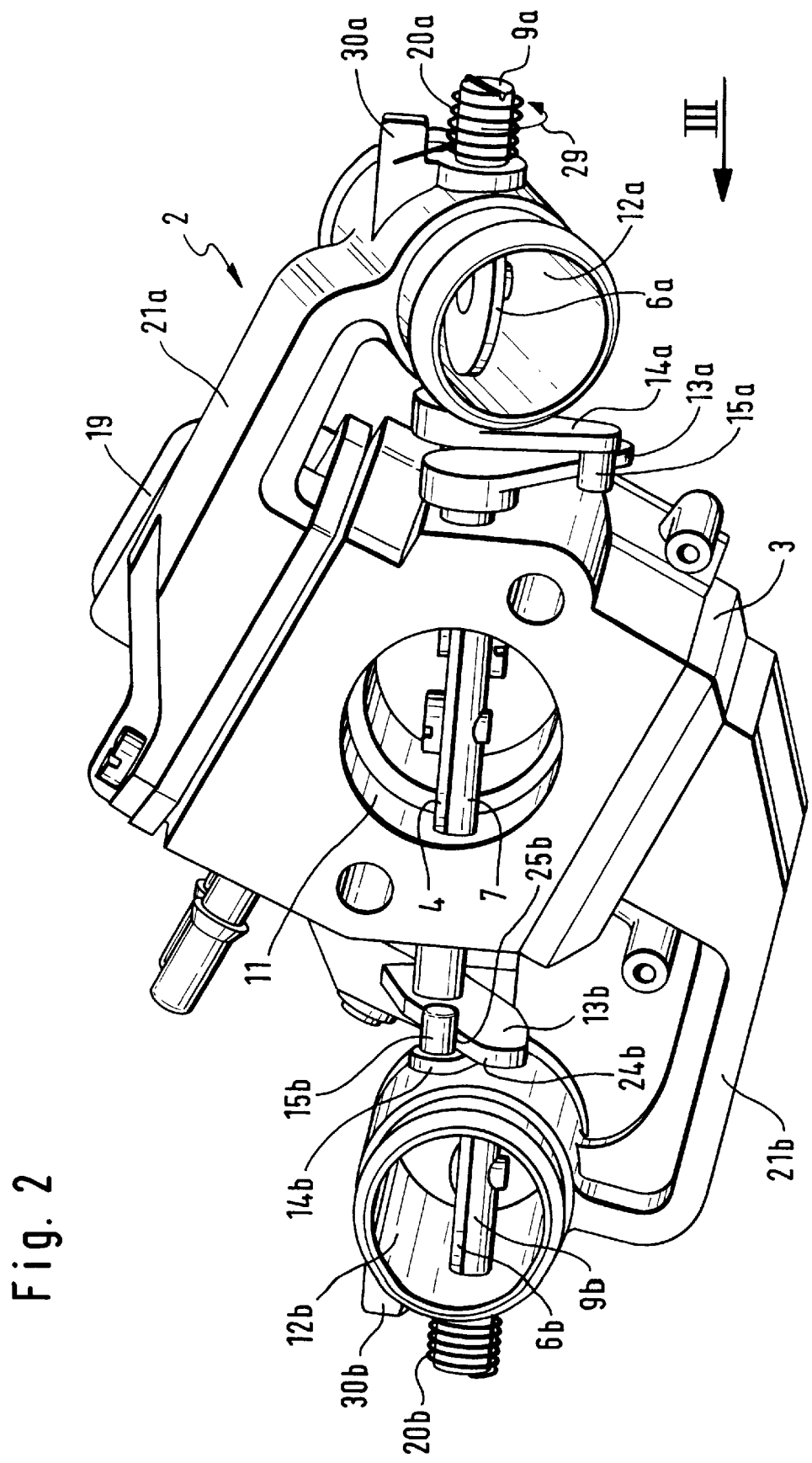
FIG. 2 is a perspective view of a diaphragm carburetor, in the full throttle position, with air channels indisposed on both sides and being rotated relative to one another.

Illustrated in FIG. 2 is a perspective view of the diaphragm carburetor 2 with the air channels 12a and 12b disposed on both sides. The mixture intake channel portion 11 is formed in the carburetor housing 3 of the diaphragm carburetor 2. In the intake channel portion 11, the butterfly valve 4 is rotatably mounted about the butterfly valve shaft 7. In the opened position illustrated in FIG. 2, the butterfly valve 4 influences the flow in the intake channel portion 11 only to an insignificant extent. Fuel-supplying channels open into the intake channel portion 11 in the region of the butterfly valve 4. These fuel-supplying channels are supplied from a fuel-filled regulating chamber that is formed in the carburetor housing 3. The quantity of fuel supplied to the intake channel portion 11 is a function of the position of the butterfly valve 4, and a pressure condition thereby formed in the intake channel portion 11, and of the pressure at the compensation channel 19. The compensation channel 19 opens out at the clean side of an air filter that is not illustrated in FIG. 2.

The portions of the air channels 12a and 12b that are disposed on both sides on the carburetor housing 3 are fixed in position on the carburetor housing 3 via arms 21a and 21b. An air valve or choke 6a, 6b is pivotably held in each air channel 12a, 12b via an air valve shaft 9a, 9b. The air valves 6a and 6b are biased in the closing direction 29 via springs 20a, 20b. The springs 20a, 20b are embodied as torsion springs, and are supported against an abutment 30a, 30b at each respective air channel 12a, 12b. The other end of each spring is fixed in position on the respective air valve shaft 9a, 9b.

On both sides, outside of the carburetor housing 3, the butterfly valve shaft 7 is provided with a lever 13a, 13b that is fixedly connected with the shaft 7 and that has an approximately rod-shaped configuration. Fixedly disposed on that end of each of the air valve shafts 9a, 9b that face the carburetor 2, outside of the air channel 12a, 12b, is a respective lever 14a, 14b. Each of the levers 14a, 14b is provided with a pin-shaped driver member 15a, 15b which, in the opened position of the air valves 6a, 6b and of the butterfly valve 4 illustrated in FIG. 2, rests against the inner contact point 25b of the respective butterfly valve lever 13a, 13b. By means of the butterfly valve levers 13a, 13b, the throttle shaft 7 thus holds the air valves 6a, 6b in the illustrated open position. To reduce the friction, the driver members 15a, 15b are rotatably mounted on the levers 14a, 14b. Thus, the driver members 15a, 15b do not slide but rather roll on the levers 13a, 13b. It can also be expedient to embody the driver members as rollers mounted on a pin.

Figure 3:
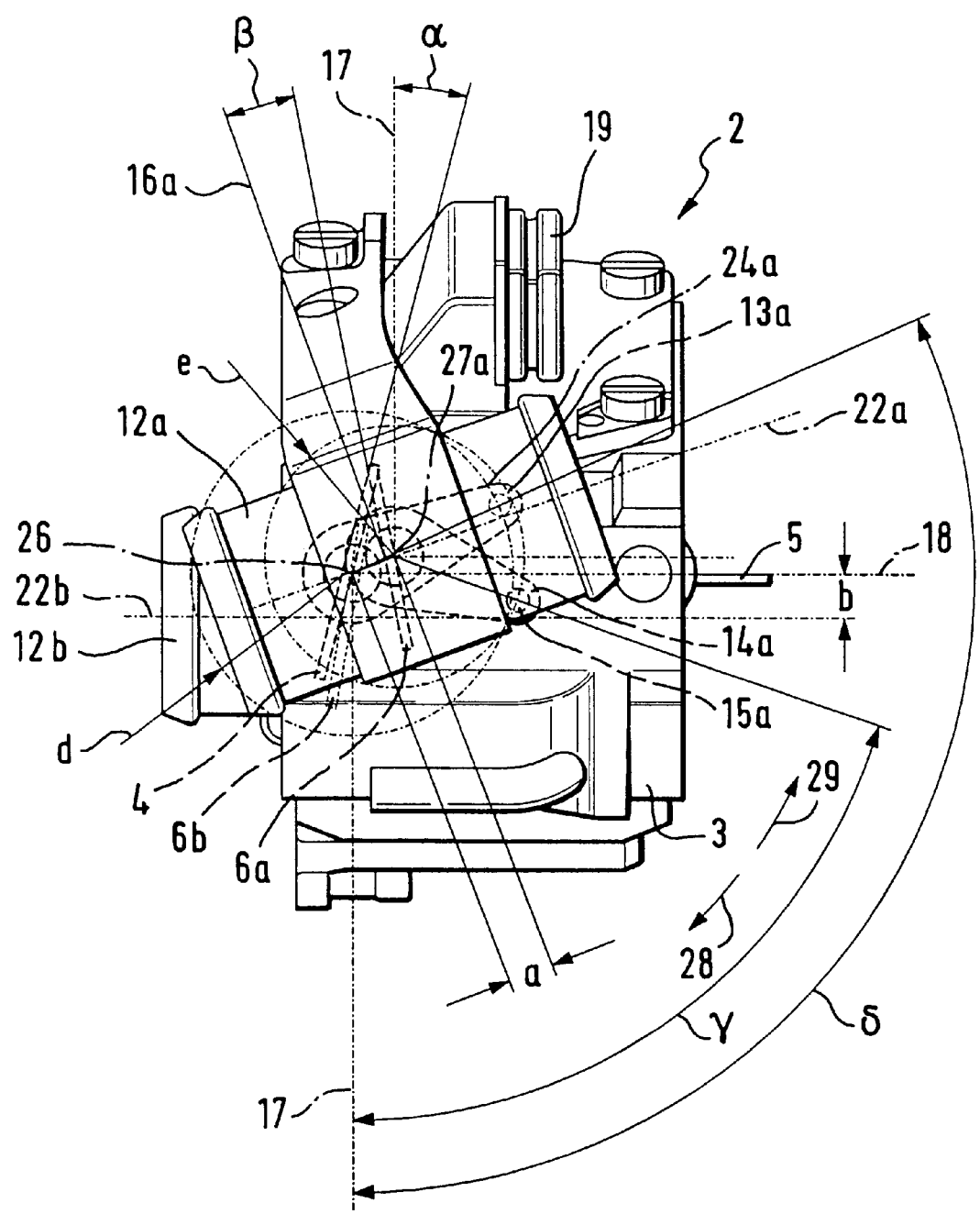
FIG. 3 is a side view of a diaphragm carburetor, in the idling position, taken in the direction of the arrow III in FIG. 2.
Figure 4:
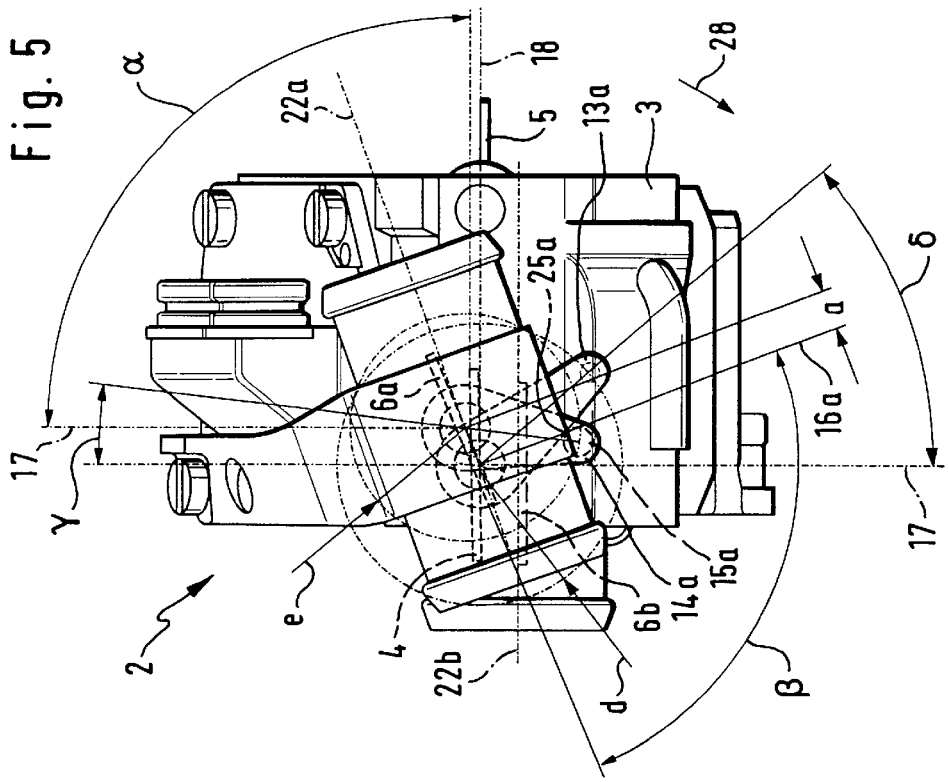
FIG. 4 is a side view of the diaphragm carburetor of FIG. 3 in the throttle gas position for starting.
Figure 5:
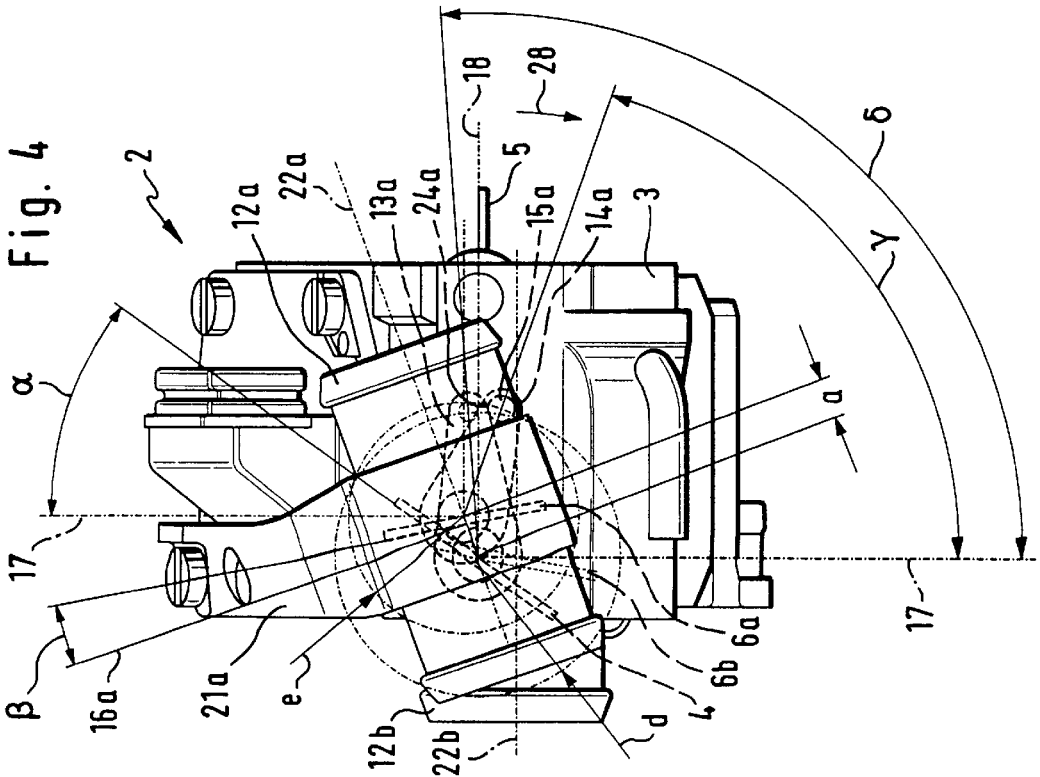
FIG. 5 is a side view of the diaphragm carburetor of FIGS. 3 and 4 in the full throttle position.

In FIGS. 3, 4 and 5, the diaphragm carburetor of FIG. 2 is illustrated in a schematic side view taken approximately in the direction of the arrow III in FIG. 2. To clarify the operation of the levers, respectively illustrated are an air valve lever 14a, the drive member 15a and the associated butterfly valve lever 13a and the position of the butterfly valve 4 and of the air valve 6a. In addition, the position of the second air valve 6b is indicated.

In FIG. 3, the diaphragm carburetor 2 is illustrated in the idling position. The axis 26 of the butterfly valve shaft 7 is spaced from the axis 27 of the air valve shaft 9 by a distance a, which in this embodiment is approximately 4 mm. However, depending upon the requirement of the engine, as well as structural and functional requirements, such as, for example, friction, the spacing can vary from 0 mm to 60 mm. The length e of the air valve lever 14a from the axis 27a of the air valve shaft 9a to the center point of the driver member 15a is, in this embodiment, 11 mm. The length d of the butterfly valve lever 13a from the axis 26 of the butterfly valve shaft 7 up to the outer contact point 24a is, in this embodiment, approximately 14 mm. The butterfly valve 4 is in the closed position and forms, with a perpendicular line 17 on the intake channel axis 18, a butterfly valve angle $\alpha$ of about 15°. The air valve 6a forms with the perpendicular line 16a on the longitudinal axis 22a of the air channel an air valve angle $\beta$ of about 10°.

The longitudinal axis 22a of the air channel is rotated relative to the longitudinal axis 18 of the intake channel by an angle $\delta$−90°, and is offset therefrom by the distance a. The angle $\delta$ designates the angle between the butterfly valve lever 13a and the perpendicular line 17 on the longitudinal axis 18 of the intake channel. The longitudinal axis 22b of the air channel 12b extends parallel to the longitudinal axis 18 of the intake channel and is spaced therefrom by a distance b, which in particular corresponds approximately to the distance a. The air valve 6b is indicated by dashed lines.

The air valve lever 14a, on which the driver member 15a is disposed, forms with the perpendicular line 17 on the longitudinal axis 18 of the intake channel an angle $\gamma$ of about 70°. The butterfly valve lever 13a forms with the perpendicular line 17 on the longitudinal axis 18 of the intake channel an angle $\delta$ of about 115°. The driver member 15a does not rest against the butterfly valve lever 13a. Thus, the throttle shaft 7 can move as far as the position illustrated in FIG. 4 in the opening direction 28 independently of the air valve shaft 9a.

In the position illustrated in FIG. 4, the driver member 15a comes to rest against the butterfly valve lever 13a. In this connection, the driver member 15a is disposed approximately at the outer contact point 24a. Upon further movement of the butterfly valve lever 13a in the opening direction 28, the air valve lever 14a is taken along in the opening direction 28 via the driver member 15a. In the throttle position for starting illustrated in FIG. 4, the butterfly valve forms with the perpendicular line 17 on the longitudinal axis 18 of the intake channel a butterfly valve angle $\alpha$ of about 35°. The angle $\delta$ between the butterfly valve lever 13a and the perpendicular line 17 is about 95°. The position of the air valve 6a and the air valve 14a is not altered relative to the position in FIG. 3.

In FIG. 5 the diaphragm carburetor is illustrated in the full throttle position. The butterfly valve 4 forms with the perpendicular line 17 on the longitudinal axis 18 of the intake channel a butterfly valve angle $\alpha$ of 90°. The driver member 15a is disposed against the throttle lever 13a at the inner contact point 25a. The air valve 6a forms with the perpendicular line 16a on the longitudinal axis 22a of the air channel an air valve angle $\beta$ of 90°. The angle $\delta$ between the perpendicular line 17 on the longitudinal axis 18 of the intake channel and the butterfly valve lever 13a is in this position approximately 40°, and the angle $\gamma$ between the perpendicular line 17 and the air valve lever 14a is approximately 10°. Upstream of the butterfly valve the choke valve 5 is rotatably mounted in the intake channel. The butterfly valve 4 and the air valves 6a and 6b move in the same direction in the exemplary embodiment of FIGS. 3 to 5.

Figure 6:
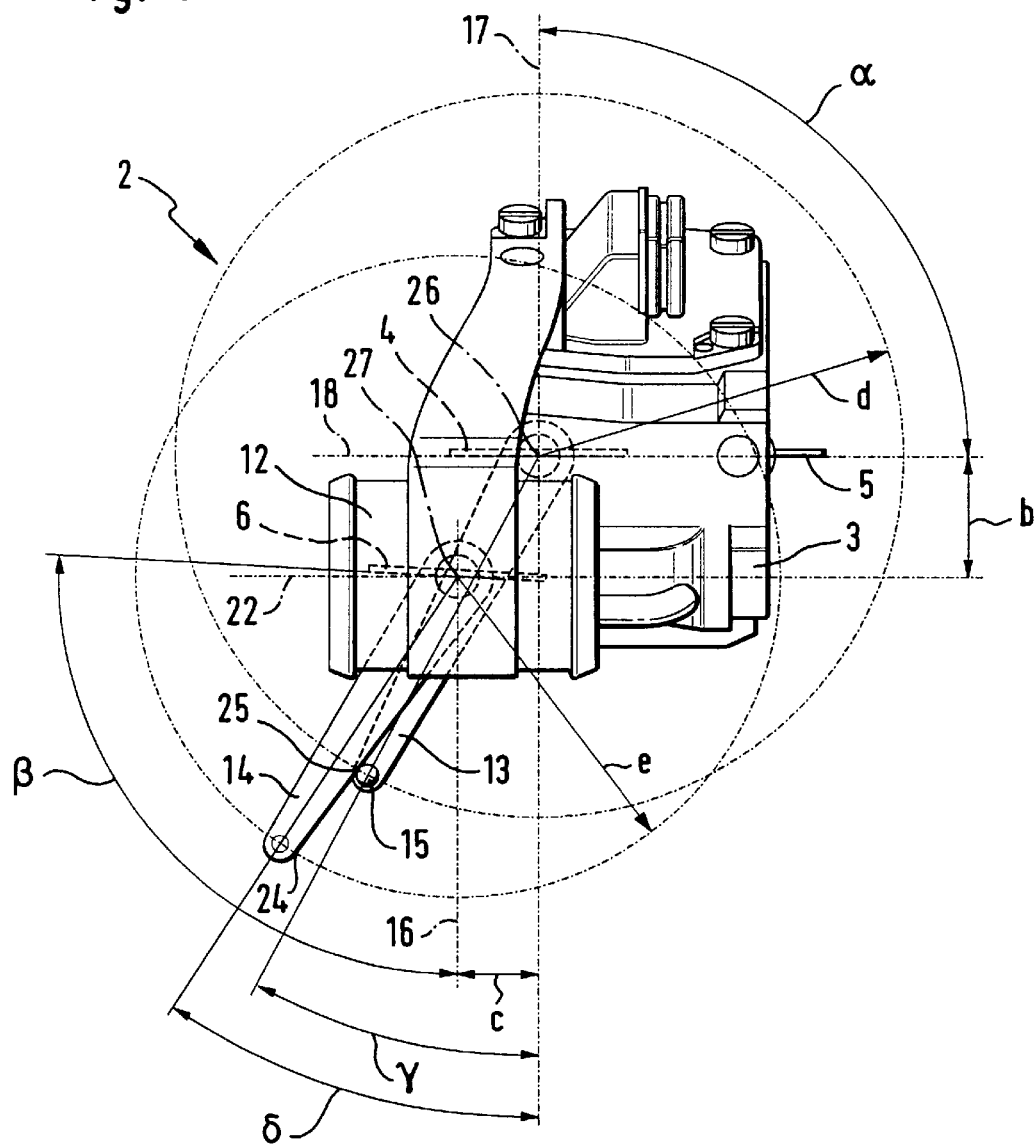
FIG. 6 shows a diaphragm carburetor, having an air channel, in the full throttle position.

Illustrated in a side view in FIG. 6 is a diaphragm carburetor 2 that is provided with only a portion of the air channel 12. The axis 27 of the air valve shaft 9 is spaced from the axis 26 of the butterfly valve shaft 7, in a direction perpendicular to the longitudinal axis 18 of the intake channel, a distance b of about 15 mm, and in a direction parallel to the longitudinal axis 18 of the intake channel a distance c of about 10 mm. The spacing of the axes 26, 27 is thus about 18 mm. The longitudinal axis 22 of the air channel extends approximately parallel to the longitudinal axis 18 of the intake channel.

In FIG. 6 the diaphragm carburetor 2 is illustrated in the full throttle position. The butterfly valve angle $\alpha$ is about 90°, and the air valve angle $\beta$ is about 90°. The length e of the butterfly valve lever 13 from the axis 26 of the butterfly valve shaft 7 up to the driver member 15 is about 40 mm. The length d of the air valve lever 14 from the axis 27 of the air valve shaft 9 up to the outer contact point 24 is about 45 mm. In the full throttle position illustrated in FIG. 6, the butterfly valve lever 13 forms with the perpendicular line 17 on the longitudinal axis 18 of the intake channel an angle $\gamma$ of about 28° and the air valve lever 14 forms with the perpendicular line 17 an angle $\delta$ of about 34°.

Figure 7:
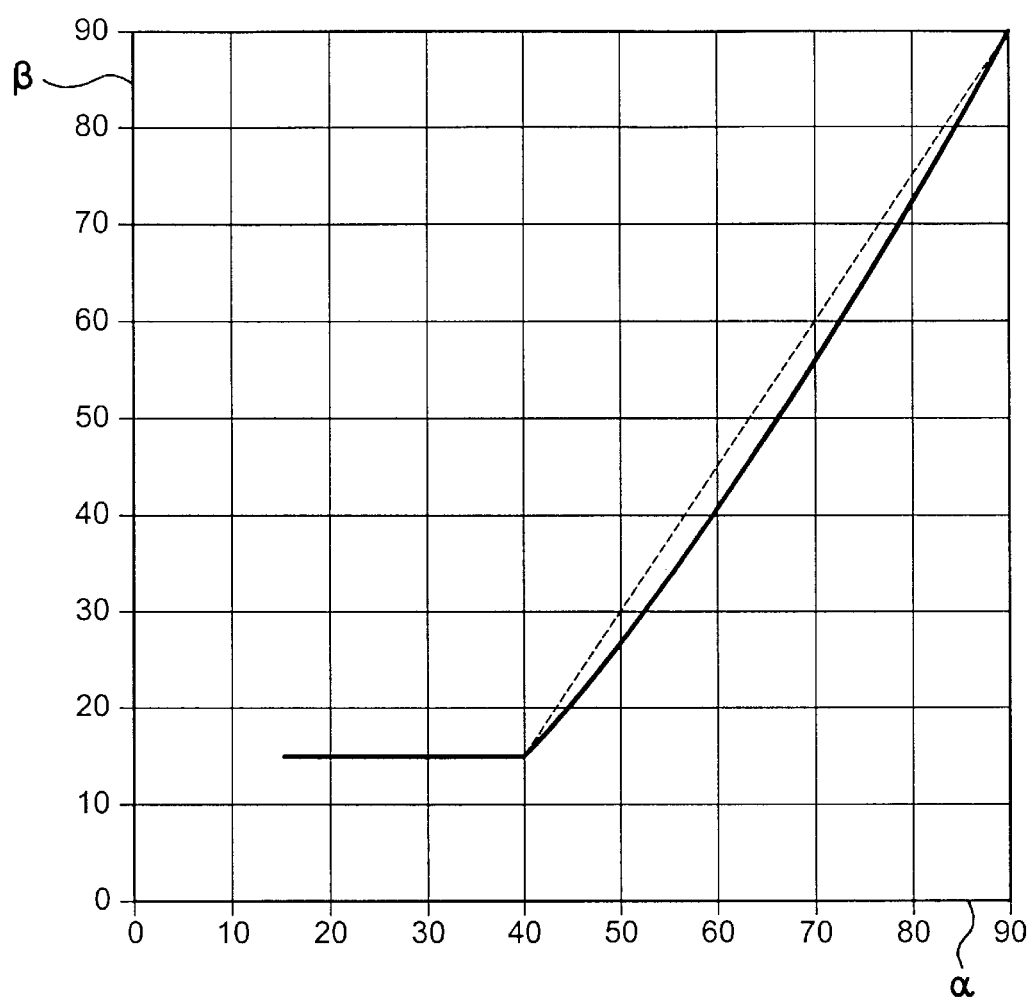
FIG. 7 is a graph of the progress of the air valve angle plotted against the progress of the butterfly valve angle for the diaphragm carburetor illustrated in FIG. 6.

In the graph of FIG. 7, the progress of the air valve angle $\beta$ is plotted against the butterfly valve angle $\alpha$. In this connection, the air valve angle $\beta$ is the angle between the air valve 6 and the perpendicular line 16 on the longitudinal axis 22 of the air channel, and the butterfly valve angle $\alpha$ is the angle between the butterfly valve 4 and the perpendicular line 17 on the longitudinal axis 18 of the intake channel. The air valve angle β is 15° until the butterfly valve angle α has reached 40°. The air valve angle β then increases in a constant gradient as a function of the butterfly valve angle α. In so doing, the air valve angle β increases more rapidly than does the butterfly valve angle α. At a higher drive throughput of the internal combustion engine, i.e. at a larger butterfly valve angle α, the quantity of air also increases super proportionally due to the super proportionally rising air valve angle β. Consequently, at full throttle good exhaust gas values result for the internal combustion engine. Due to structural reasons, it can also be expedient for the air valve angle β to be greater than 90° in the full throttle position.

Figure 8:
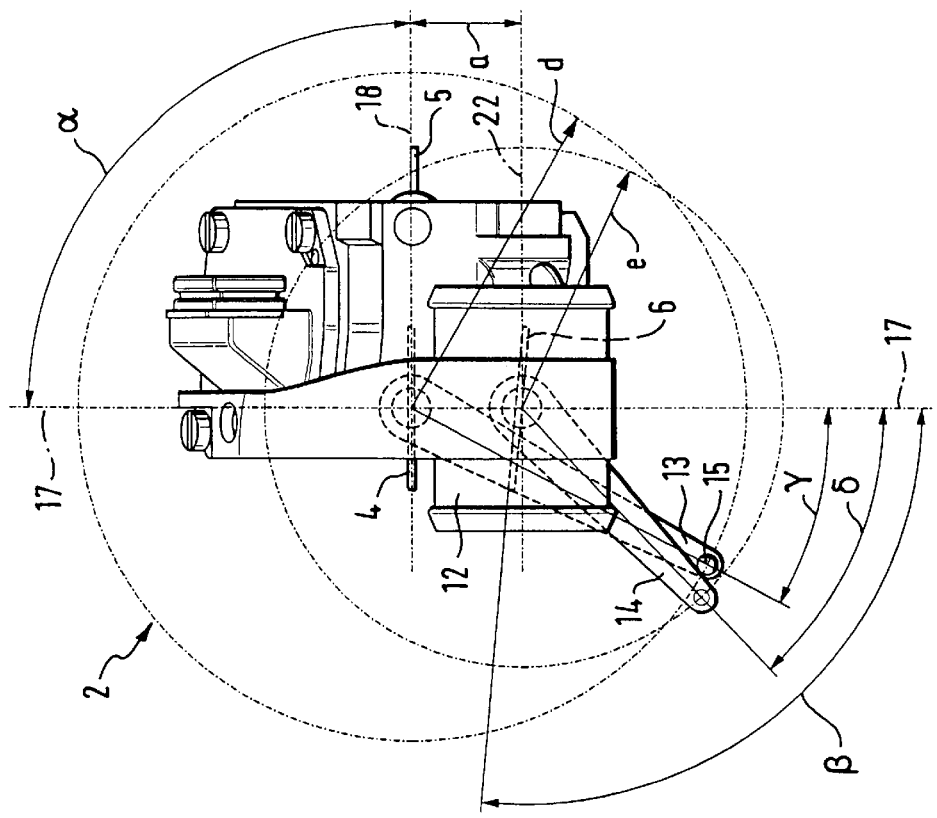
FIG. 8 is a side view of a diaphragm carburetor, having an air channel, in the throttle gas position for starting.
Figure 9:
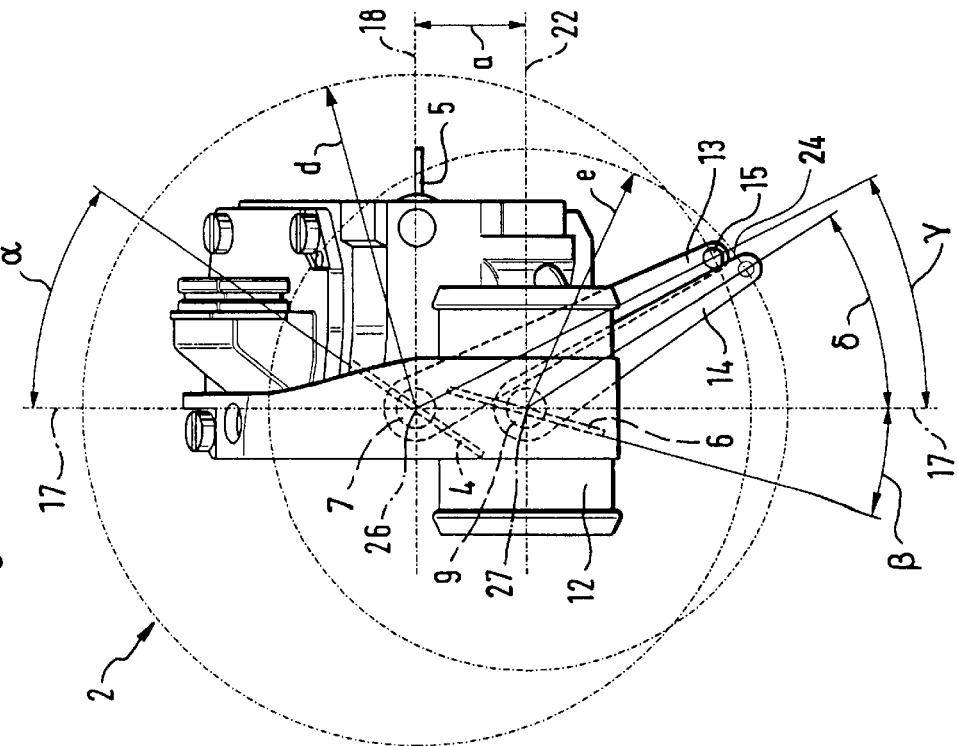
FIG. 9 is a side view of the diaphragm carburetor of FIG. 8 in the full throttle position.

FIGS. 8 and 9 illustrate an exemplary embodiment of a diaphragm carburetor 2 of a diaphragm carburetor 2 where the axes 26 and 27 of the butterfly valve shaft 7 and the air valve shaft 9 have a spacing a of 15 mm. In FIG. 8, the diaphragm carburetor 2 is illustrated in the throttle position for starting, and in FIG. 9 in the full throttle position. In FIG. 8 the butterfly valve angle α is approximately 35°, and the air valve angle β is approximately 15°. The air valve 6 is thus not yet in the closed position. The butterfly valve lever 13, on which the driver member 15 is disposed, comes in the position illustrated in FIG. 8 in engagement with the air valve lever 14. The air valve lever 14 forms with the perpendicular line 17 to the longitudinal axis 18 of the intake channel an angle δ of about 32°, and the butterfly valve lever 13 forms an angle γ of 27°. The length e of the air valve lever 14 from the axis 27 of the air valve shaft 9 up to an outer contact point 24 is about 35 mm. The length d of the butterfly valve lever 13 from the axis 26 of the butterfly valve shaft 7 to the driver member 15 is about 45 mm.

In the full throttle position of the diaphragm carburetor 2 illustrated in FIG. 9, the air valve angle β is about 95° and the butterfly valve angle α is about 90°. The angle γ between the butterfly valve lever 13 and the perpendicular line 17 on the longitudinal axis 18 of the intake channel is about 28°, and the angle δ between the air valve lever 14 and the perpendicular line 17 is about 47°. The length d of the butterfly valve lever 13 is three times the spacing a, and the length e of the air valve lever 14 is about 2.3 times the spacing a.

Figure 10:
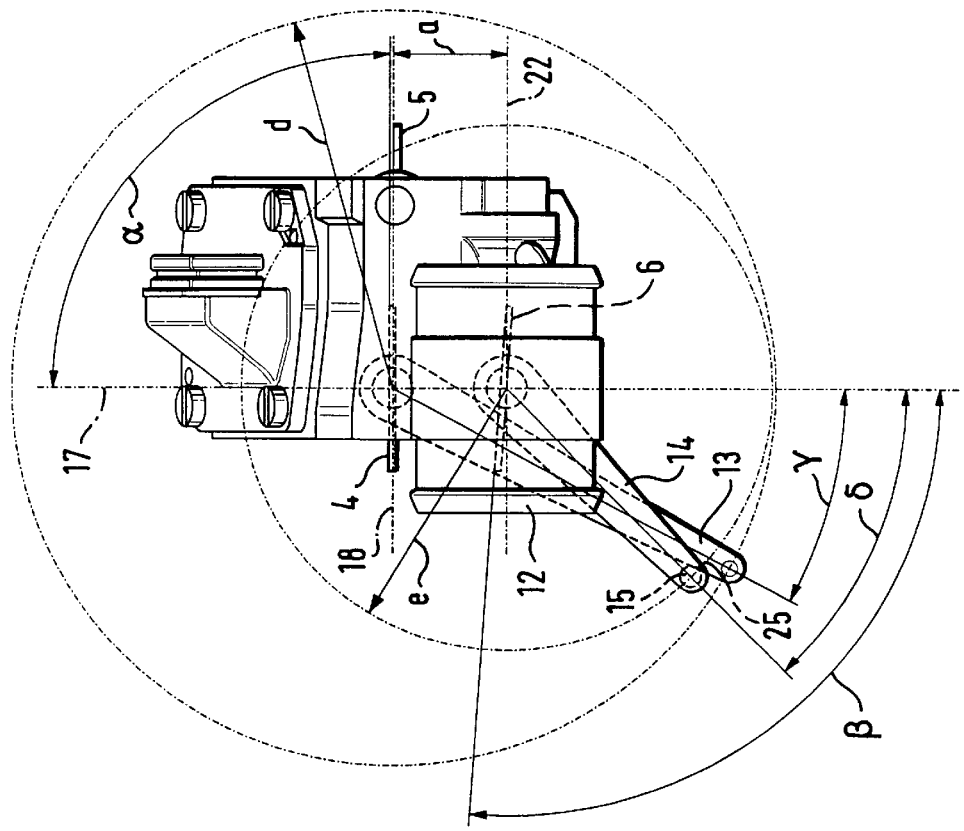
FIG. 10 is a side view of a diaphragm carburetor, having an air channel, in the throttle gas position for starting.
Figure 11:
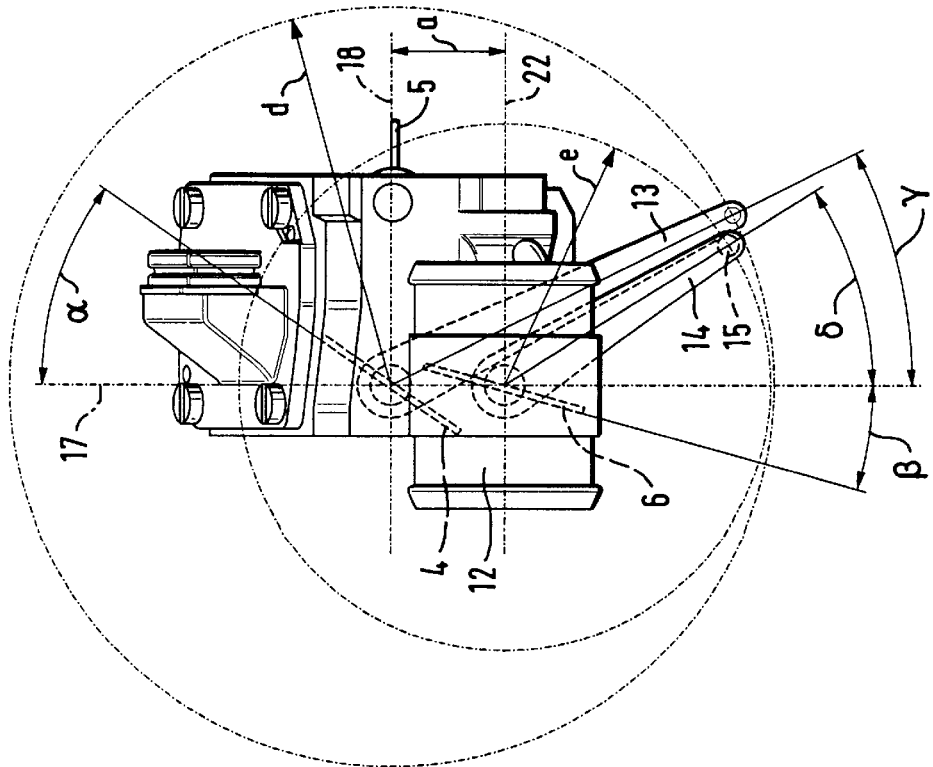
FIG. 11 is a side view of the diaphragm carburetor of FIG. 10 in the full throttle position.

FIGS. 10 and 11 show a further exemplary embodiment, where the driver member 15 is disposed on the air valve lever 14. The length e of the air valve lever 14 is about 35 mm, and the length d of the butterfly valve lever 13 is about 50 mm. The angle γ between the butterfly valve lever 13 and the perpendicular line 17 is about 27° and the angle δ between the air valve lever 14 and the perpendicular line 17 is about 32°. The butterfly valve angle α is about 35° and the air valve angle β is about 15°. In the full throttle position illustrated in FIG. 11, the butterfly valve angle α is 90°, the air valve angle β is about 93°, the angle γ between the butterfly valve lever 13 and the perpendicular line 17 is about 28°, and the angle δ between the air valve lever 14 and the perpendicular line 17 is about 46°. The spacing a is, as in FIGS. 8 and 9, about 15 mm, however the ratio of the length d of the butterfly valve lever 13 to the spacing a is about 3.3.

FIGS. 12 and 13 illustrate a further exemplary embodiment where the spacing a between the axis 26 of the butterfly valve shaft 7 and the axis 27 of the air valve shaft 9 is about 30 mm. The length d of the butterfly valve lever 13, on which the driver member 15 is disposed, is, from the axis 26 up to the driver member 15, approximately 90 mm, and the length e of the air valve lever 14 from the axis 27 to the outer contact point 24 is about 68 mm. In the throttle gas position for starting illustrated in FIG. 12, the butterfly valve angle α is about 35° and the air valve angle β is about 15°. The air valve lever 14 is inclined relative to the perpendicular line 17 by the angle δ of about 36°, and the butterfly valve lever 15 is inclined by an angle γ of 27°. In the full throttle position illustrated in FIG. 15, where the butterfly valve angle α is 90° and the air valve angle β is about 95°, the butterfly valve lever 13 forms with the perpendicular line 17 an angle γ of about 28°, and the air valve lever 14 forms an angle δ of about 44°. The length d of the butterfly valve lever 13 is here also about 3 times the spacing a, and the length e of the air valve lever 14 is about 2.3 times the spacing. The length ratio d/a and e/a can here be between 1.1 and 15, depending upon engine, structural and functional requirements.

Figure 14:
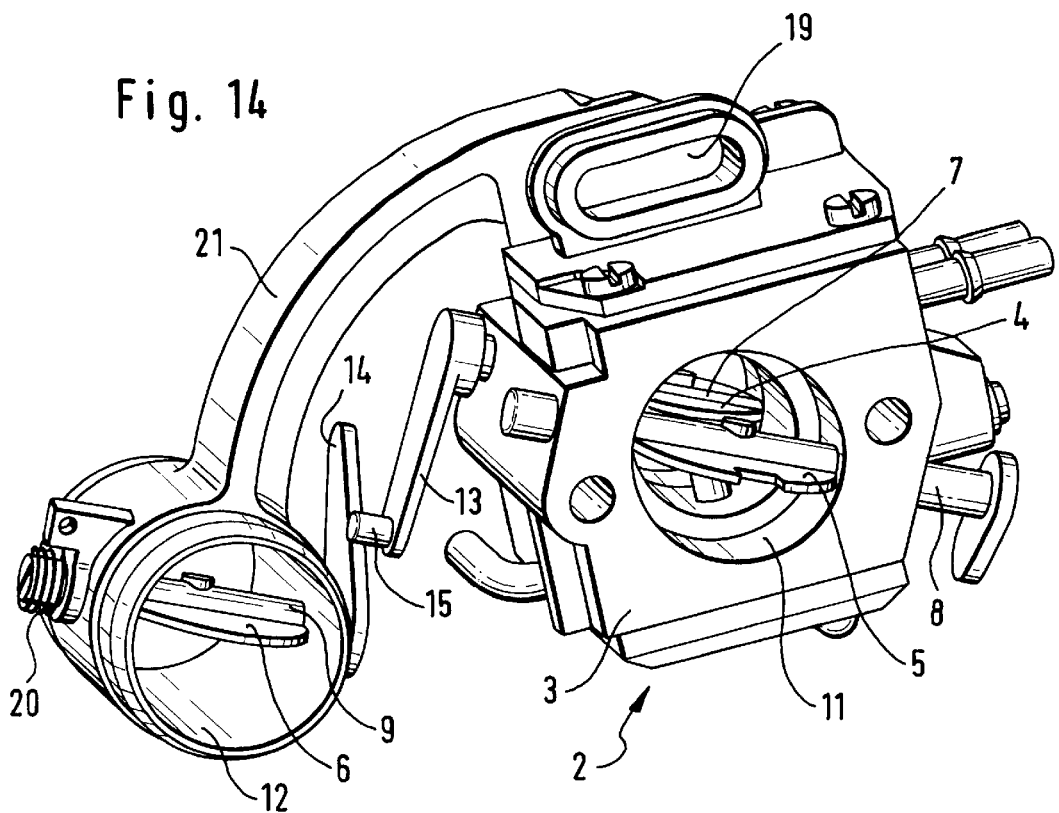
FIG. 14 is a perspective view of a diaphragm carburetor having an air channel.
Figure 15:
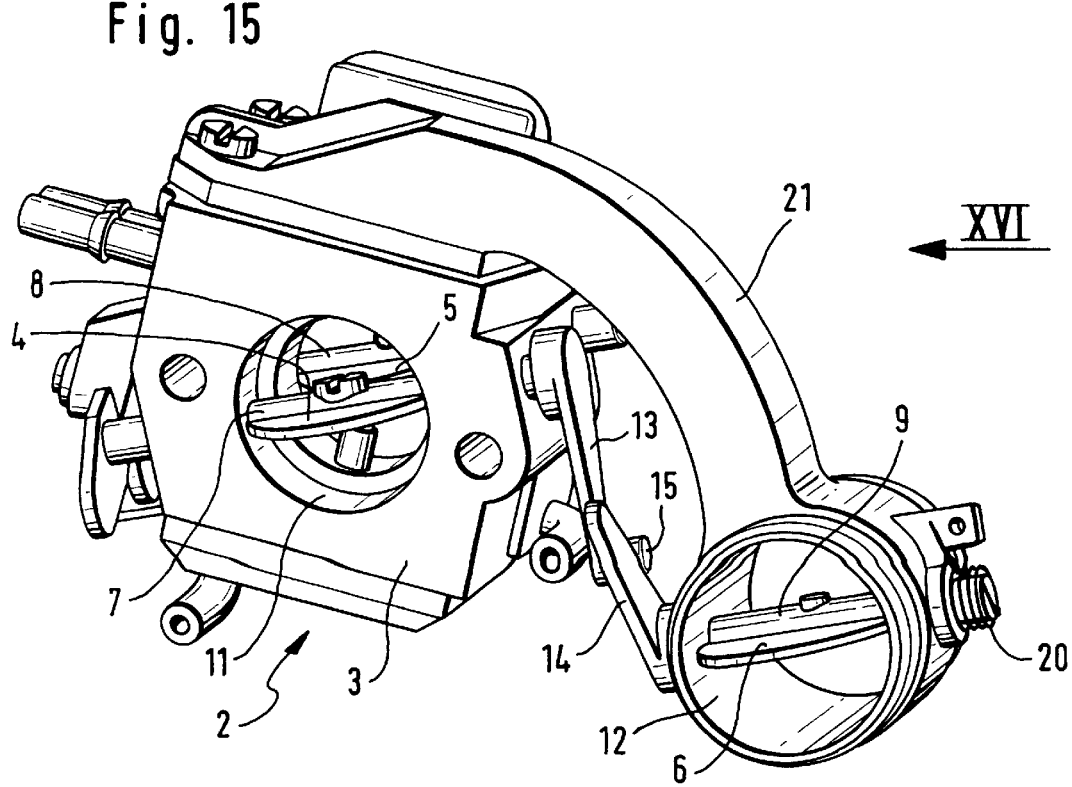
FIG. 15 is another perspective view of the diaphragm carburetor of FIG. 14.
Figure 16:
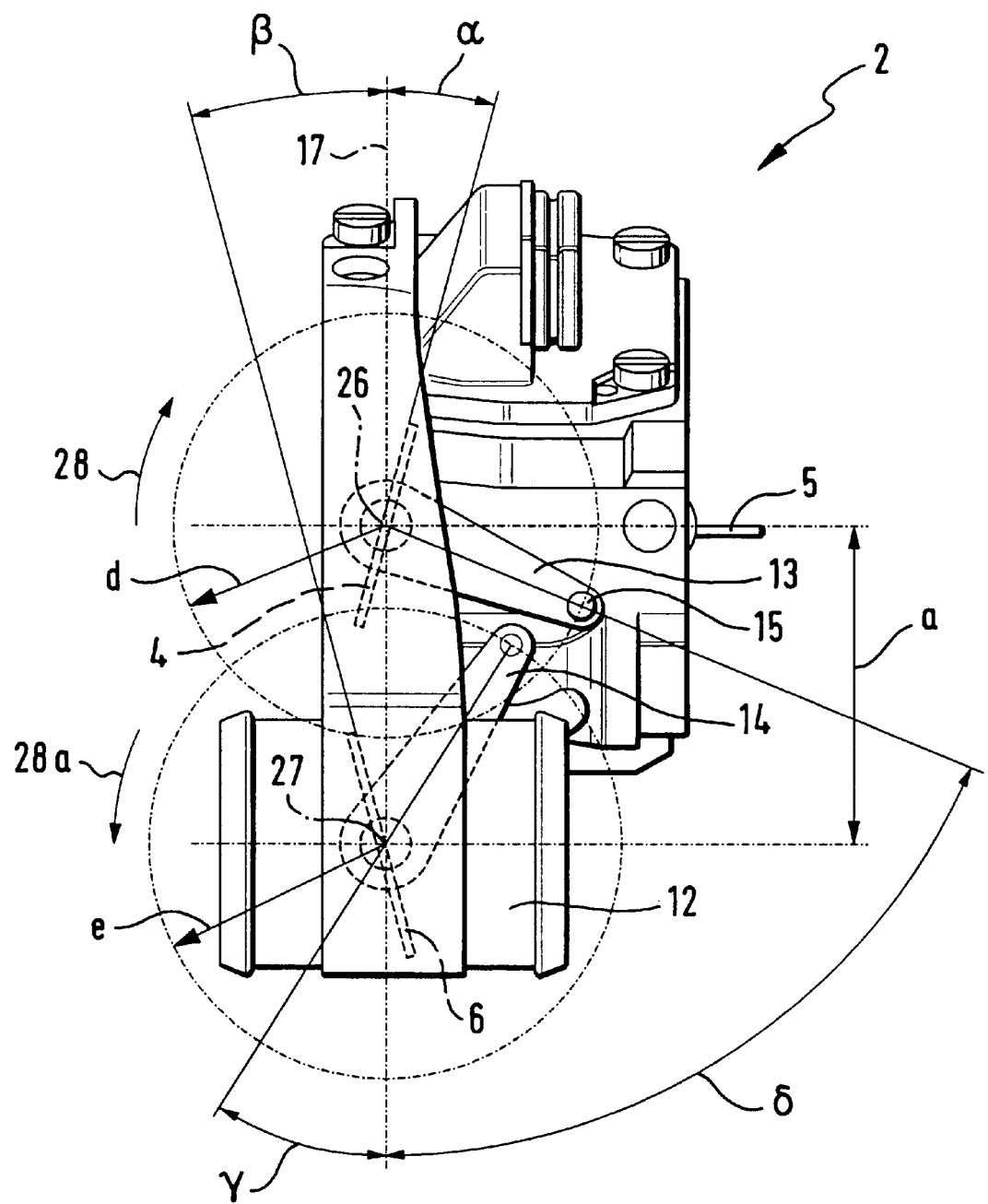
FIG. 16 is a side view of the diaphragm carburetor, in the idling position, taken in the direction of the arrow XVI in FIG. 15.
Figure 18:
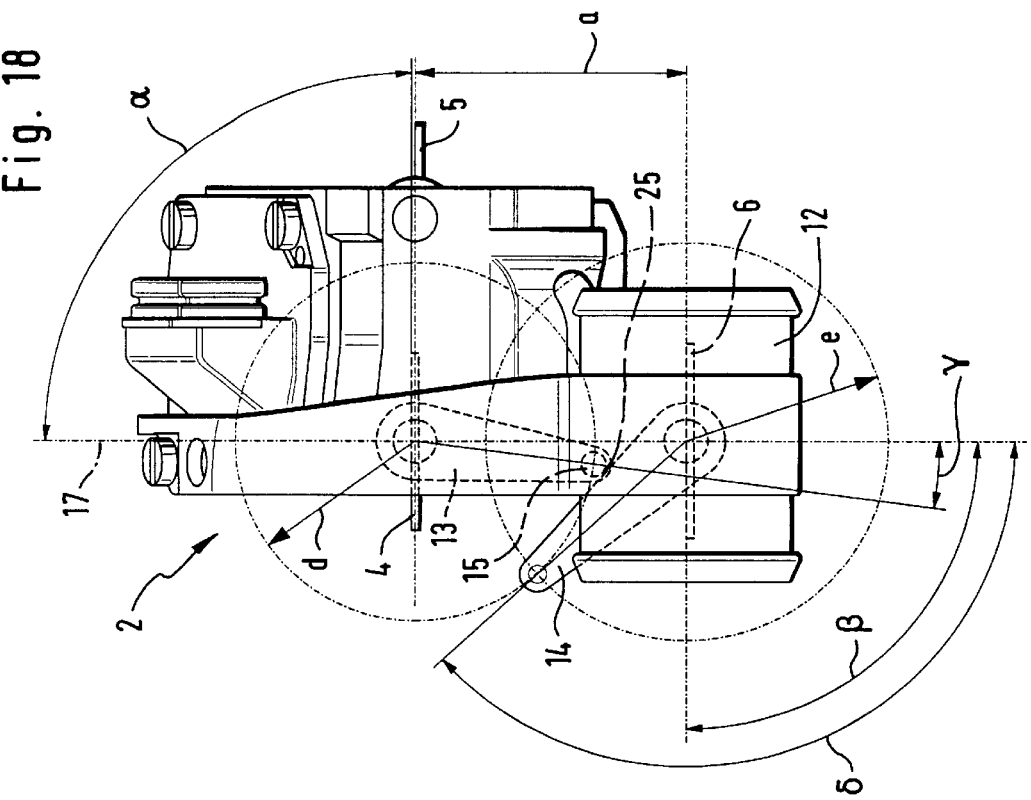
FIG. 18 is a side view of the diaphragm carburetor of FIGS. 16 and 17 in the full throttle position.
Figure 17:
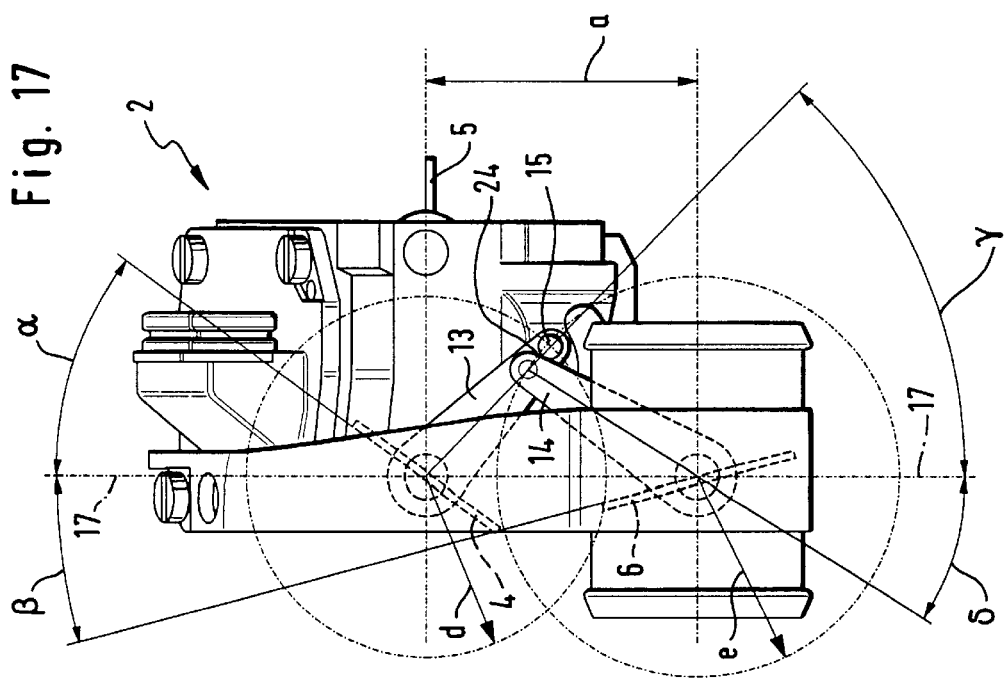
FIG. 17 is a side view of the diaphragm carburetor of FIG. 16 in the throttle gas position for starting.

In FIGS. 14 and 15, illustrated in a perspective view is a diaphragm carburetor 2, on the housing 3 of which a portion of an air channel 12 is held via an arm 21. In the air channel, the air valve 26 is rotatably mounted on the air valve shaft 9 and is biased in the closing direction via the spring 20. The intake channel portion 11 is formed in the carburetor housing 3. Upstream of a butterfly valve 4 that is held on the butterfly valve shaft 7 is the choke valve 5, which is pivotably held on a choke valve shaft 8. The air valve 6 is coupled to the butterfly valve 4 via the air valve lever 14, the butterfly valve lever 13, and the driver member 15, which is disposed on the butterfly valve lever 14. In FIGS. 14 and 15, the diaphragm carburetor 2 is illustrated in the full throttle position. In FIGS. 16 to 18, the diaphragm carburetor 2 is shown in a side view, approximately in the viewing direction of the arrow XVI in FIG. 15.

In the idling position illustrated in FIG. 16, the butterfly valve angle α is about 15°, and the air valve angle β is also about 15°. The butterfly valve 4 and the air valve 6 are, however, inclined in opposite directions. The opening direction 28 of the butterfly valve 4 extends counter to the opening direction 28a of the air valve 6. The spacing a between the axis 26 of the butterfly valve shaft 7 and the axis 27 of the air valve shaft 9 is about 30 mm. The length d of the butterfly valve lever from the axis 26 up to the driver member 15 is about 20 mm, and the length e of the air valve lever 14 from the outer contact point 24 illustrated in FIG. 17 up to the axis 27 of the air valve shaft 9 is about 22 mm. In the idling position illustrated in FIG. 16, the air valve lever 14 forms with the perpendicular line 17 an angle γ of about 33°, and the butterfly valve lever 13 forms an angle δ of 67°.

Figure 19:
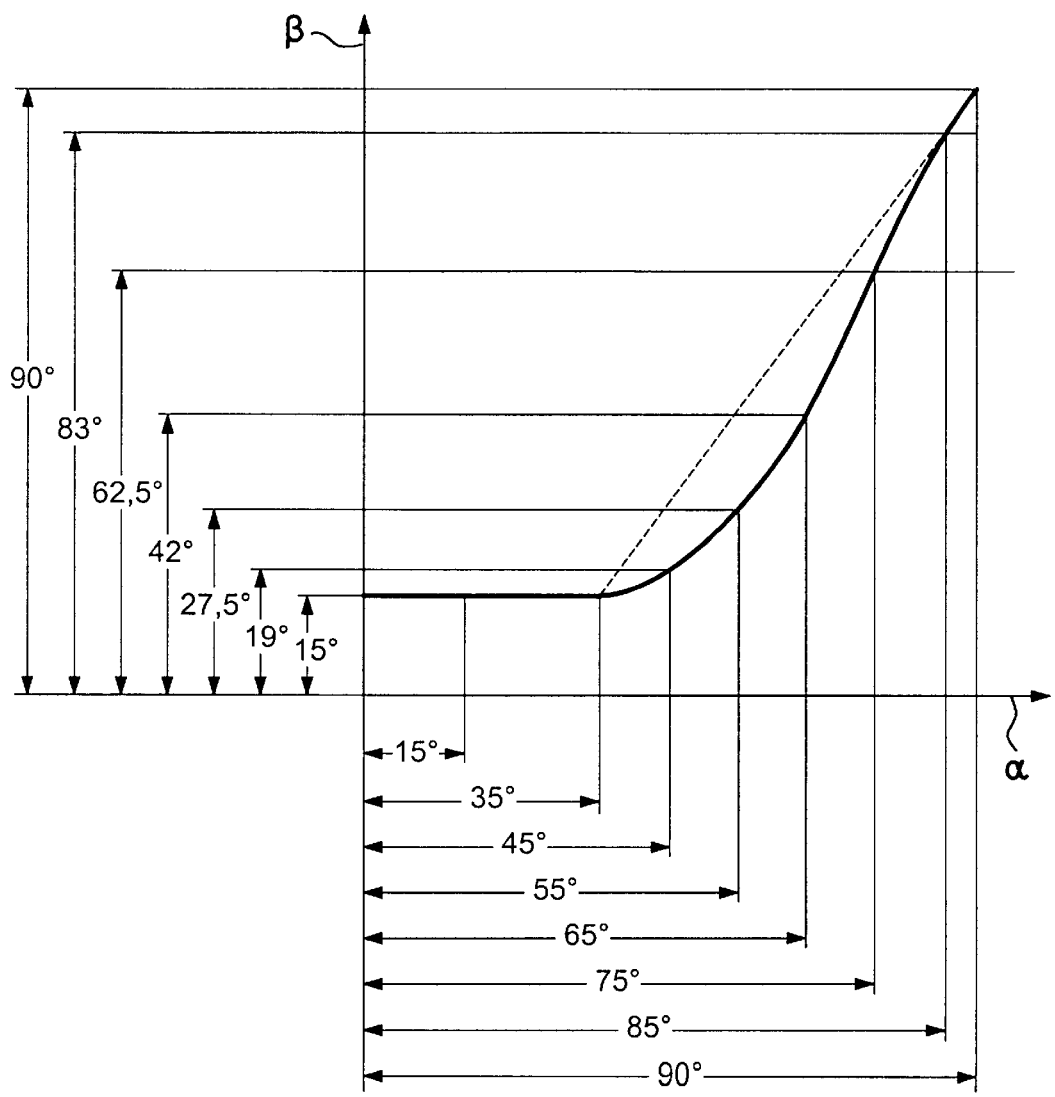
FIG. 19 is a graph of the progress of the air valve angle plotted against the butterfly valve angle for the diaphragm carburetor illustrated in FIGS. 16–18.

In FIG. 17, the diaphragm carburetor 2 of FIG. 16 is illustrated in the throttle gas position for starting. In this position, the butterfly valve angle α is about 35°, and the air valve angle β is, as previously, about 15°. The butterfly valve lever 13 forms with the perpendicular line 17 an angle of about 47°. In the full throttle position illustrated in FIG. 18, the butterfly valve angle α is 90°, and the air valve angle β is also about 90°. The air valve lever 14 forms with the perpendicular line an angle δ of about 138°, and the butterfly valve lever 13 forms an angle γ of about 8°. In FIG. 19, the progress of the air valve angle β is plotted against the butterfly valve angle α. The air valve angle β begins to rise as soon as the air valve angle α reaches 35°. At lower butterfly valve angles α, i.e. in the lower speed range, the air valve angle β first rises slowly. At larger butterfly valve angles α, in other words, in the higher load range, the air valve angle β increases, however, super proportionally. As a result, a good exhaust gas quality is achieved at full load. During movement from a partial throttle position, in which the driver member 15 comes into engagement with the air valve lever 14, up to the full throttle position, the driver member 15 slides on the air valve lever 14 between the outer contact point 24 and the inner contact point 25.

Figure 20:
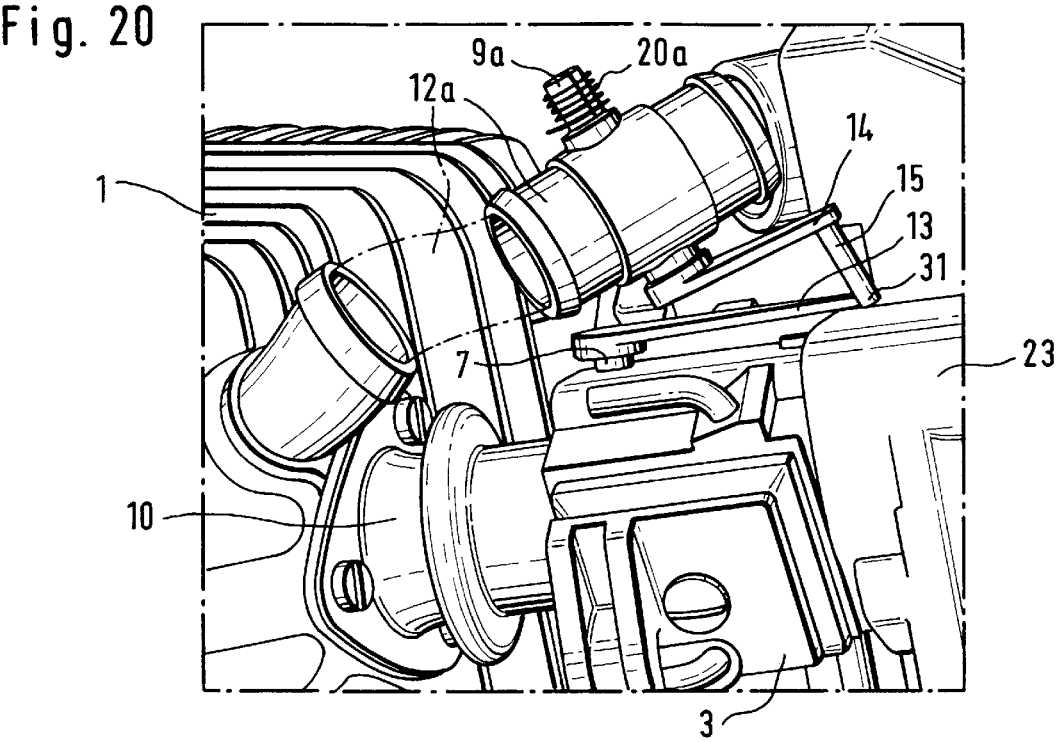
FIG. 20 is a perspective view of the coupling of the butterfly valve shaft and the air valve shaft, which extend in a skewed manner.
Figure 21:
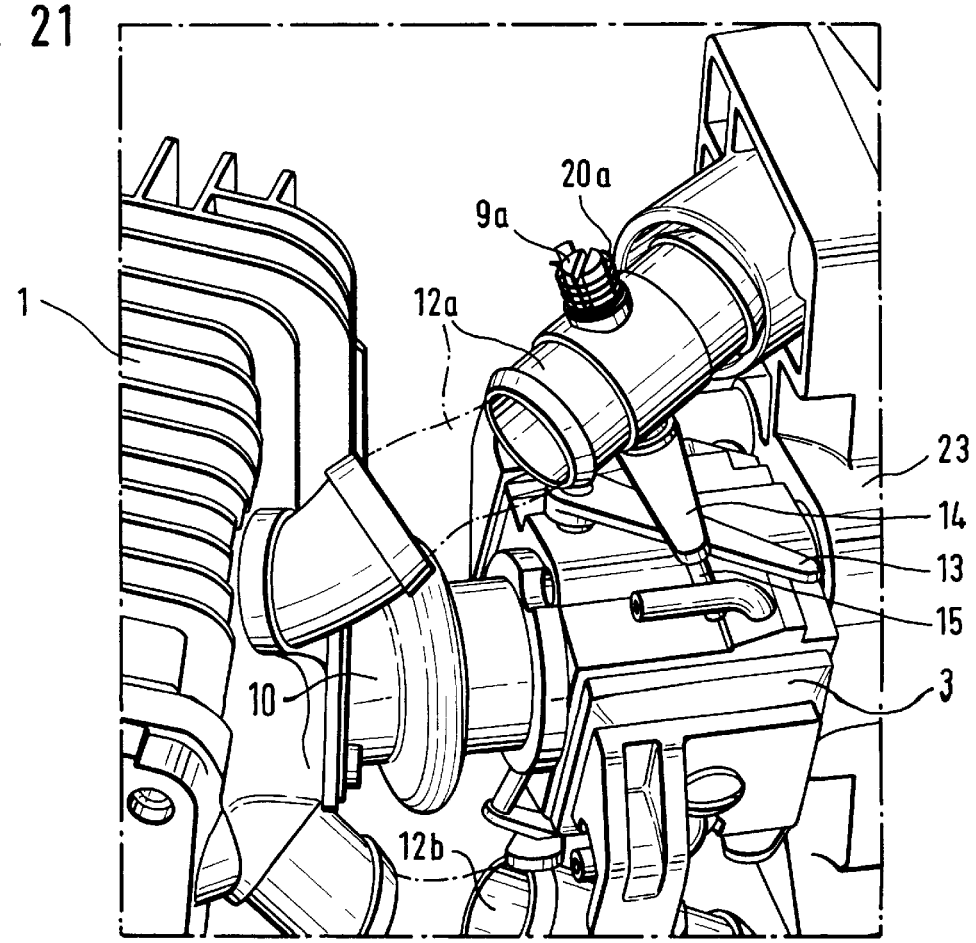
FIG. 21 is another perspective view of the coupling of FIG. 20.

In FIGS. 20 and 21, illustrated in a perspective view is an exemplary embodiment where the butterfly valve shaft 7 extends in a skewed manner relative to the air valve shaft 9a. In this connection, air channels 12a, 12b are disposed on both sides of the intake channel 10 and supply additional combustion air to the internal combustion engine 1. However, it can also be expedient to provide only a single air channel 12 for supplying air to the internal combustion engine 1. The driver member 15, via which the air valve lever 14 is connected to the butterfly valve lever 13, has a relatively long configuration. That end 31 of the driver member 15 that is remote from the air valve lever 14 rests against the butterfly valve lever 13. This ensures that even in the full throttle position illustrated in FIG. 20, the levers 13, 14 are coupled with one another. In FIG. 21, the diaphragm carburetor 2 is illustrated in the throttle gas position for starting. In this position, the driver member 15 rests against the throttle valve lever 13 in the region of the air valve lever 14. Disposed upstream on the carburetor housing 3 is an air filter 23 at which also the air channels 12a and 12b open. The compensation channel 19, which is not illustrated in FIGS. 20 and 21, also adjoins the air filter 23.

Figure 22:
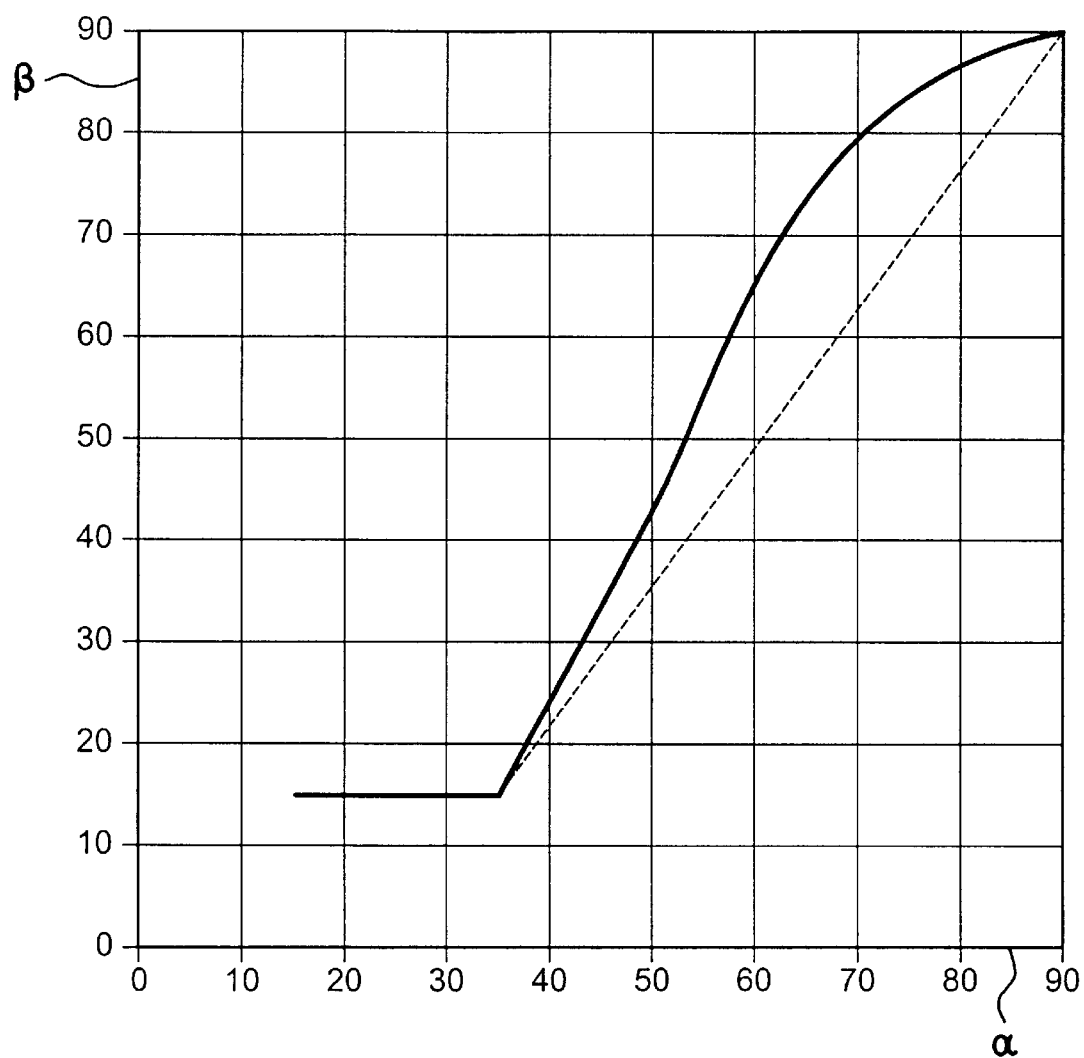
FIG. 22 is a graph of the progress of the air valve angle plotted against the butterfly valve angle for a further diaphragm carburetor.

FIG. 22 illustrates a graph in which the air valve angle β is plotted against the butterfly valve angle α. The air valve angle β is 15°, until the air valve angle α has reached 35°. Subsequently, both angles α, β increase, whereby the air valve angle β first increases super proportionally. The curve has a digressive or diminishing course, since at a higher drive throughput of the internal combustion engine, the butterfly valve angle α increases super proportionally. At a butterfly valve angle α of 90°, the air valve angle β is also 90°. Other curves of the air valve angle and the butterfly valve angle can also be expedient.

Figure 23:
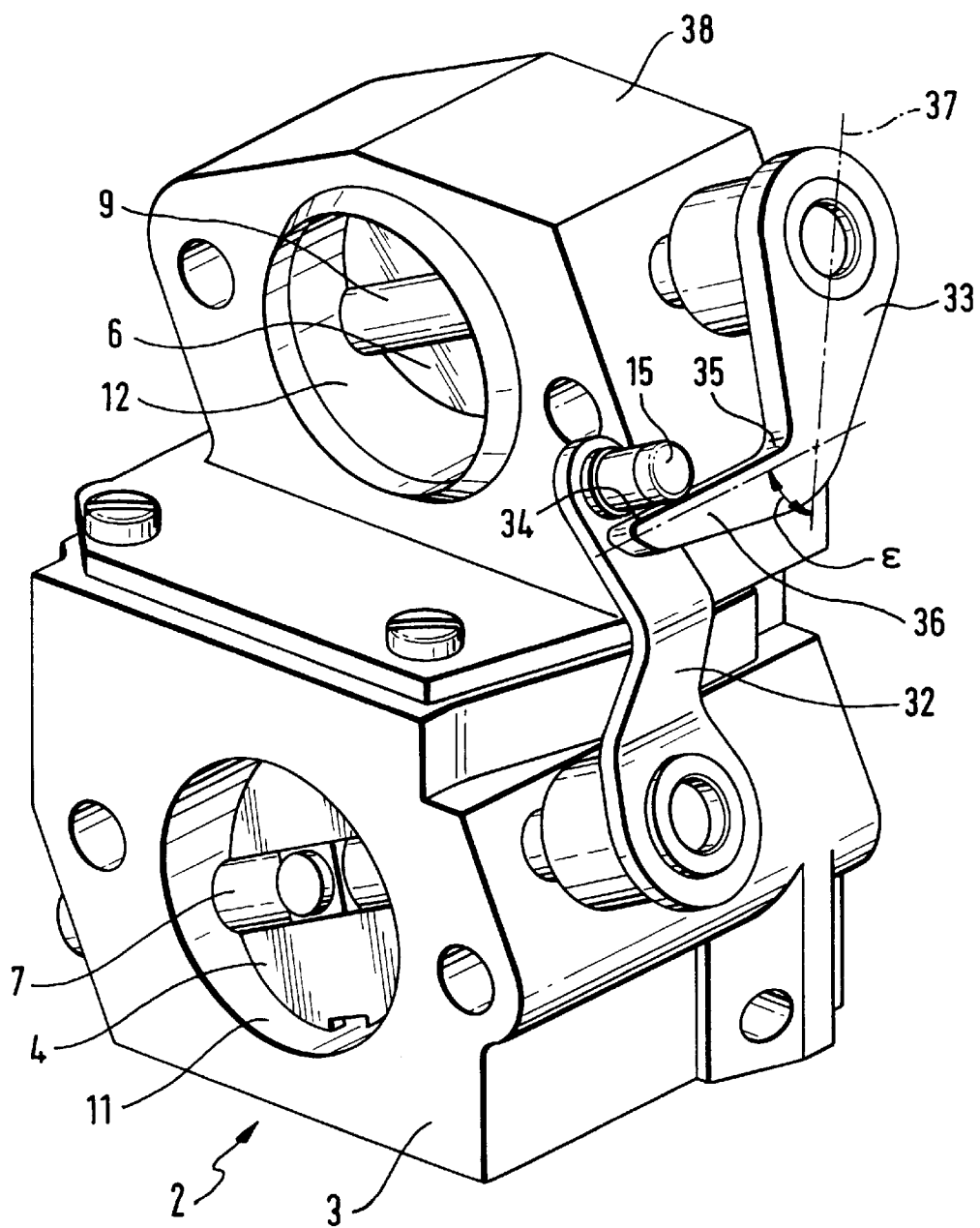
FIG. 23 is a perspective view of a coupling of a butterfly valve shaft and air valve shaft in the idling position.
Figure 24:
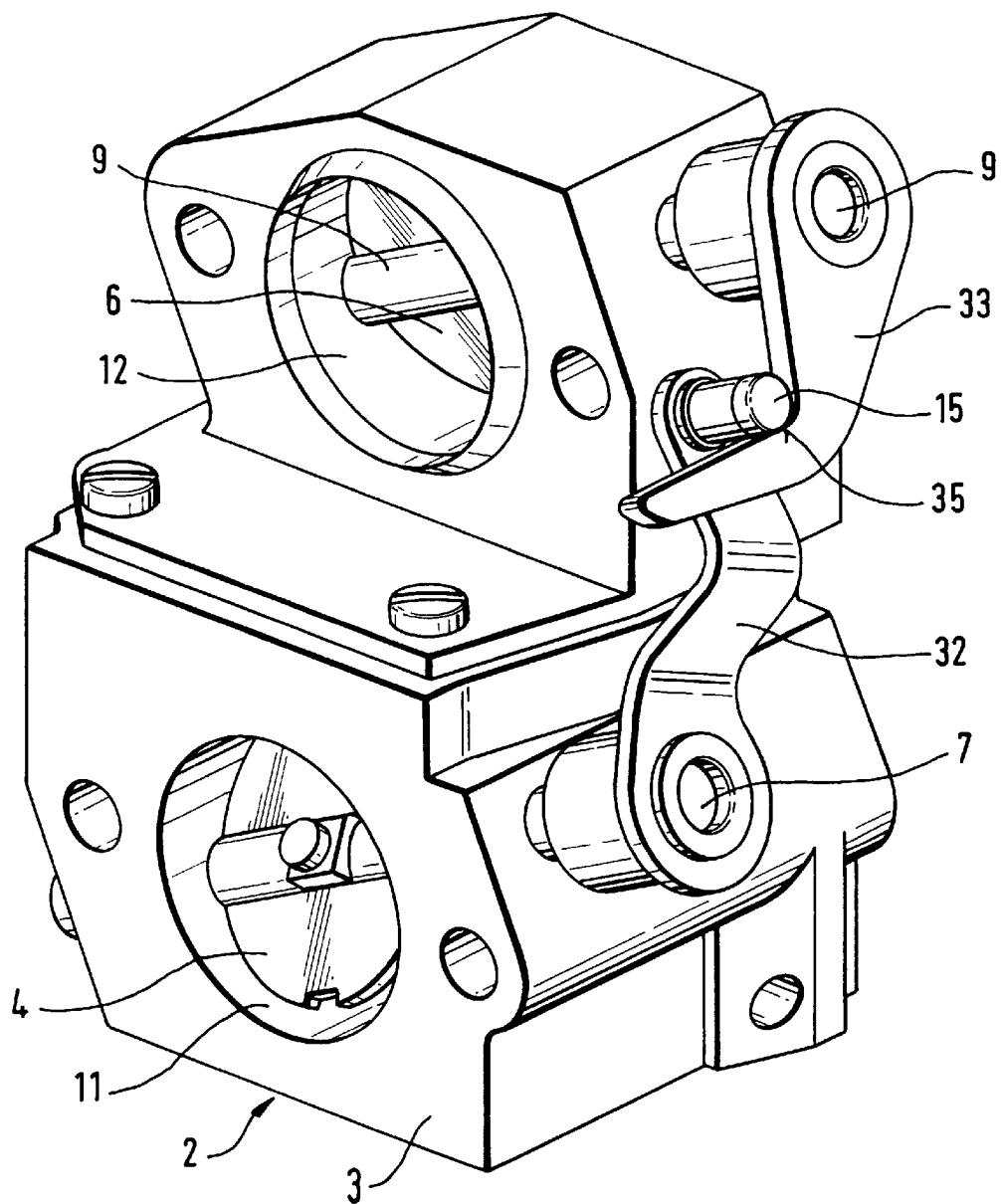
FIG. 24 shows the coupling of FIG. 23 in the throttle gas position for starting.
Figure 25:
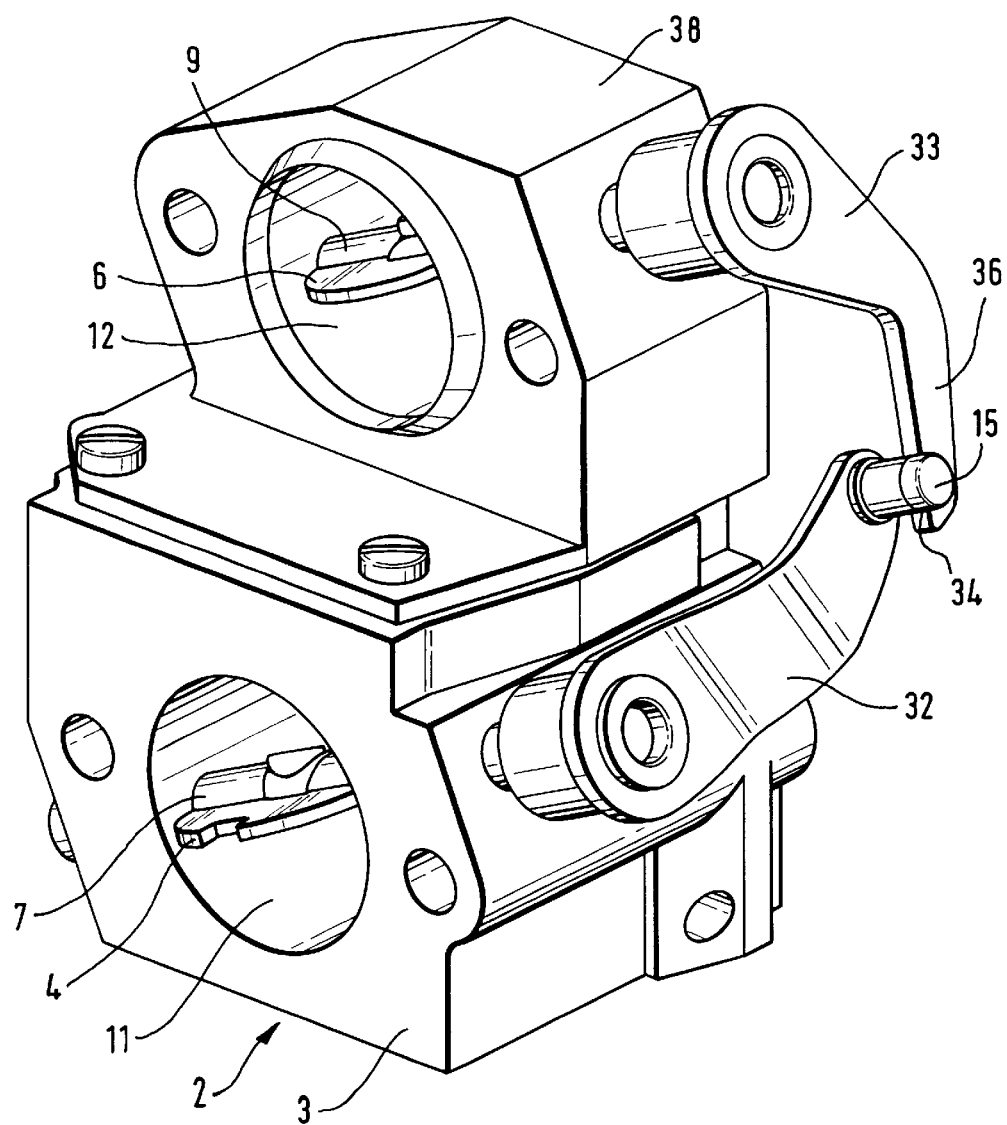
FIG. 25 shows the coupling of FIG. 23 in the full throttle position.

FIGS. 23 to 25 illustrate an exemplary embodiment of a coupling of the butterfly valve shaft 7 and the air valve shaft 9. Fixedly disposed on the butterfly valve shaft 7 is a butterfly valve lever 32 on which is disposed a driver member 15. When viewed in its longitudinal extension, the butterfly valve lever 32 has a step so that it is guided closely against the carburetor housing 3. The air channel 12 is partially formed in an air channel housing 38 that is fixed upon the carburetor housing 3. The air valve 6, which is pivotably held in the air channel 12, is disposed approximately at the level of a choke valve that is disposed in the carburetor housing 3 but is not illustrated in FIG. 23. Fixedly disposed on the air valve shaft 9 is an air valve lever 33, which has a bent or angled-off configuration. The angled portion 36 of the air valve lever 33 forms an angle ε with a radial line 37 relative to the air valve shaft 9. The angled portion 36 includes the outer contact point 34 and the inner contact point 35, between which the driver member 15 rolls on the air valve lever 33.

In the idling position illustrated in FIG. 23, the driver member 15 rests against the air valve lever 33 in the region of the outer contact point 34. In the throttle gas position for starting illustrated in FIG. 24, the butterfly valve lever 32 is rotated relative to the idling position illustrated in FIG. 23 in the opening direction of the air valve 6. The driver member 15 rests against the air valve lever 33 at the inner contact point 35. In contrast to the position illustrated in FIG. 23, the air valve 6 is not opened or is opened only slightly. During further opening of the butterfly valve 4, the driver member moves from the inner contact point 35 in a direction toward the outer contact point 34 up to the full throttle position illustrated in FIG. 25, where the butterfly valve 4 and the air valve 6 are each completely opened.

As a consequence of the angling of the air valve lever 33, it is possible to realize a small installation space for the coupling. In particular, a contact of the air valve lever 33 with an air filter that is customarily disposed upstream of the air valve and the butterfly valve is avoided. It can be expedient to angle only the butterfly valve lever or both levers. Multiple anglings can also be expedient to adapt to a prescribed installation space.

The specification incorporates by reference the disclosure of German priority documents 102 21 446.8 filed May 15, 2002 and 102 49 717.6 filed Oct. 25, 2002.

The present invention is, of course, in no way restricted to the specific disclosure of the specification and drawings, but also encompasses any modifications within the scope of the appended claims.

What is claimed is:

1. A diaphragm carburetor for an internal combustion engine that operates with scavenging, comprising:
   a carburetor housing in which is formed an intake channel portion;
   a butterfly valve disposed in said intake channel portion and rotatably held via a butterfly valve shaft, wherein fuel-supplying channels open into said intake channel portion in a vicinity of said butterfly valve;
   at least one air channel for supplying additional air for combustion, wherein said at least one air channel is provided with an air valve that is rotatably held via an air valve shaft and wherein said butterfly valve and said air valve are movable, in a closing direction, from an open position into a closed position, and in an opening direction, from said closed position into said open position;
   mechanical coupling means for mechanically coupling said air valve over an angular range with a movement of said butterfly valve, wherein said mechanical coupling means includes a butterfly valve lever that is fixedly connected with said butterfly valve shaft, and also includes an air valve lever that is fixedly connected with said air valve shaft; and
   a driver member disposed on one of said levers wherein at least in a given angular range said driver members slides on the other of said levers between an outer contact point and an inner contact point.

2. A diaphragm carburetor according to claim 1, wherein said levers have an approximately rod-shaped configuration.

3. A diaphragm carburetor according to claim 1, wherein said driver member is mounted on said one lever.

4. A diaphragm carburetor according to claim 1, wherein in a region of said mechanical coupling means, an axis of said butterfly valve shaft, and an axis of said air valve shaft, are spaced from one another.

5. A diaphragm carburetor according to claim 4, wherein said spacing is in the range of from 2 to 150 mm.

6. A diaphragm carburetor according to claim 1, wherein said butterfly valve shaft and said air valve shaft extend parallel to one another.

7. A diaphragm carburetor according to claim 1, wherein said butterfly valve shaft and said air valve shaft extend in a manner skewed relative to one another.

8. A diaphragm carburetor according to claim 1, wherein said opening direction of said butterfly valve and of said air valve extend in opposite directions of rotation.

9. A diaphragm carburetor according to claim 8, wherein a length of at least one of said butterfly valve lever and said air valve lever from an axis of said butterfly valve shaft or from an axis of said air valve shaft to said outer contact point or to said driver member is 0.1 to 0.9 times a spacing between said axes of said butterfly valve shaft and said air valve shaft.

10. A diaphragm carburetor according to claim 1, wherein said opening direction of said butterfly valve and of said air valve extend in the same direction of rotation.

11. A diaphragm carburetor according to claim 10, wherein a length of at least one of said butterfly valve lever and said air valve lever from an axis of said butterfly valve shaft or an axis of said air valve shaft, up to said outer contact point or to said driver member is 1.1 to 15 times a spacing between said axes of said butterfly valve shaft 7 and said air valve shaft.

12. A diaphragm carburetor according to claim 1, wherein said air valve shaft is spring loaded in a closing direction.

13. A diaphragm carburetor according to claim 1, wherein in said closed position said air valve forms an air valve angle of 7 to 20° with a perpendicular line to a longitudinal axis of said at least one air channel.

14. A diaphragm carburetor according to claim 1, wherein in said closed position said butterfly valve forms a butterfly valve angle of 10 to 20° with a perpendicular line to a longitudinal axis of said intake channel portion.

15. A diaphragm carburetor according to claim 14, wherein said butterfly valve angle is 15°.

16. A diaphragm carburetor according to claim 14, wherein in said closed position said butterfly valve angle corresponds approximately to an air valve angle.

17. A diaphragm carburetor according to claim 1, wherein said butterfly valve is rotatable by an angular difference of about 10 to 30° from said closed position in said opening direction independently of said air valve.

18. A diaphragm carburetor according to claim 1, wherein said one lever has an angled-off configuration.

19. A diaphragm carburetor according to claim 18, wherein a portion of said one lever is angled off, and wherein said angle-off portion includes said outer contact point 34 and said inner contact point.

* * * * *